(12) United States Patent
Seeley

(10) Patent No.: US 11,333,160 B2
(45) Date of Patent: *May 17, 2022

(54) ULTRA-QUIET PROPELLER SYSTEM

(71) Applicant: Brien Aven Seeley, Santa Rosa, CA (US)

(72) Inventor: Brien Aven Seeley, Santa Rosa, CA (US)

(*) Notice: Subject to any disclaimer, the term of this patent is extended or adjusted under 35 U.S.C. 154(b) by 106 days.

This patent is subject to a terminal disclaimer.

(21) Appl. No.: 16/999,454

(22) Filed: Aug. 21, 2020

(65) Prior Publication Data

US 2021/0139133 A1 May 13, 2021

Related U.S. Application Data

(63) Continuation-in-part of application No. PCT/US2019/029237, filed on Apr. 25, 2019.

(51) Int. Cl.
| | |
|---|---|
| *F04D 29/18* | (2006.01) |
| *B64C 11/20* | (2006.01) |
| *F04D 29/38* | (2006.01) |
| *B64C 11/18* | (2006.01) |
| *B64C 11/00* | (2006.01) |
| *B64C 11/08* | (2006.01) |
| *B64C 11/06* | (2006.01) |
| *B64C 11/16* | (2006.01) |

(Continued)

(52) U.S. Cl.
CPC .......... *F04D 29/181* (2013.01); *B64C 11/008* (2013.01); *B64C 11/06* (2013.01); *B64C 11/08* (2013.01); *B64C 11/16* (2013.01); *B64C 11/18* (2013.01); *B64C 11/20* (2013.01); *B64C 23/065* (2013.01); *F04D 29/384* (2013.01); *F04D 29/388* (2013.01); *B64C 27/001* (2013.01)

(58) Field of Classification Search
None
See application file for complete search history.

(56) References Cited

U.S. PATENT DOCUMENTS

| | | | |
|---|---|---|---|
| 2,399,828 A | * 5/1946 | Jean | B64C 11/343 |
| | | | 416/139 |
| 4,789,306 A | * 12/1988 | Vorus | B63H 1/26 |
| | | | 416/243 |
| 5,096,013 A | 3/1992 | Yoshida et al. | |

(Continued)

*Primary Examiner* — Michael Lebentritt

(57) ABSTRACT

A propeller system combines innovative strategies to create a new methodology to reduce propeller or rotor noise. The propeller is specifically aimed for ultra-quiet electrically powered aircraft for use in high proximity aviation, but its low-noise advantages will extend to other purposes. The propeller blade includes geometries, along with size and operational limitations that minimize rotational and vortex noise, vibration and span-wise air flow on the blade. To further reduce noise, the propeller provides greater relative thrust on the inboard portions of the blade than do conventional propellers and provides less than conventional relative thrust including negative thrust at the outermost portions of the blade. The propeller blade includes stepped changes in local blade stiffness at calculated intervals that can reduce resonant blade vibrations and their resultant noise. This ultra-quiet propeller design can also be used for quieting hovercraft, drones, surveillance aircraft, indoor fans, wind tunnels and other applications.

20 Claims, 12 Drawing Sheets

(51) Int. Cl.
    *B64C 23/06*        (2006.01)
    *B64C 27/00*        (2006.01)

(56) References Cited

U.S. PATENT DOCUMENTS

| | | |
|---|---|---|
| 5,131,604 A | 7/1992 | Yoerkie, Jr. et al. |
| 6,086,330 A | 7/2000 | Press et al. |
| 8,393,567 B2 | 3/2013 | Moore et al. |
| 8,469,306 B2 | 6/2013 | Kuhn, Jr. |
| 8,622,334 B2 | 1/2014 | Drela et al. |
| 10,415,581 B1 * | 9/2019 | Seeley ................ F04D 29/384 |
| 2016/0244147 A1 | 8/2016 | Araa et al. |
| 2016/0318606 A1 | 11/2016 | Rahrig et al. |
| 2017/0138715 A1 * | 5/2017 | Higbie ................ G01B 3/004 |
| 2019/0248472 A1 * | 8/2019 | Zipszer ................ B64C 27/473 |

* cited by examiner

ULTRA-QUIET PROPELLER SYSTEM

CROSS REFERENCE TO RELATED APPLICATIONS

This application is a continuation in part of PCT application No. PCT/US2019/029237, having an international filing date of Apr. 25, 2019, which claims the benefit of priority to U.S. provisional patent application No. 62/662,652 filed on Apr. 25, 2018; the entirety of each of which is hereby incorporated by reference herein.

BACKGROUND OF THE INVENTION

Field of the Invention

The present invention relates to ultra-quiet propeller and rotor systems that enable urban air mobility, urban air cargo delivery, and quiet regional sky transit.

BACKGROUND

Since 2007, when the first Electric Aircraft Symposium took place in San Francisco, there has been a growing awareness of the possibility of practical electrically-powered flight. This possibility was publicly demonstrated in 2011 with the awarding of aviation's largest ever prize to the winner of the NASA Green Flight Challenge sponsored by Google, in which a 4-seat battery powered aircraft flew nearly 200 miles non-stop at 107 mph while achieving the equivalent of 403.5 passenger mile per gallons. Since that time, the development of more advanced energy storage devices and driverless electric cars, along with the ever-worsening surface gridlock in transportation, has opened a frontier for a new type of high proximity aviation in which ultra-quiet, electrically-powered propeller and rotor aircraft could provide trips of under 200 miles across urban mega-regions to and from small airparks that have high proximity to where people live and work. Numerous survey studies of community airport noise tolerance show that these aircraft will require extremely quiet propulsion systems in order to be community acceptable. There is very limited prior art in this frontier regarding ultra-quiet propulsion. The extant body of research on quieting propellers is incomplete due in part to the emergence in circa 1950 of the turbo-jet engine as the dominant new method for aircraft propulsion, an event that largely redirected aeronautical research efforts away from propeller-driven aircraft. The large airports necessary to jet aircraft could easily contain the noise of even the noisiest propeller aircraft, lessening the impetus for quiet propeller research.

SUMMARY OF THE INVENTION

The invention is directed to ultra-quiet propeller and rotor systems for use in, but not limited to aviation, and that are crucial to enabling quiet urban air mobility.

As used herein to describe the present invention, the word propeller is to be interpreted as intending to also include the word rotor, regardless of its direction of thrust and regardless of whether the rotor is ducted or an open rotor, since the invention strategies herein are applicable to and comprehend both devices. Likewise, the present invention also includes propellers and rotors whose blade shapes are mirror-images of one another so thereby to include those designed for primarily clockwise rotation as well as those designed for primarily counterclockwise rotation. Consequently, the words blade shape and blade angle as used herein to describe the present invention are to be interpreted to include those of mirror-image shapes, and the word rotation as used herein is likewise to be interpreted to include rotation in any direction.

From prior art[1], we know that propeller noise includes noise attributable to several different sources. The two basic sources are rotational noise and vortex noise:

1) Rotational noise, which is also known as discrete frequency noise, is that due to the air disturbances caused by the rotating propeller blade passage that makes thrust. Rotational noise depends upon propeller RPM and includes both thickness noise due to the propeller blade's thickness dividing and displacing the air as it rotates, as well as the more prominent loading noise due to accelerating air to make thrust. Making greater thrust makes greater noise. The additional noise that occurs when a propeller or rotor operates in an airflow whose direction is not aligned with the thrust axis of the propeller is included here as rotational noise. In flight, the thrust axis typically aligns closely with the direction of travel of the aircraft and runs through the center of the propeller hub, perpendicular to the propeller disc's plane of rotation. With directly driven, non-geared propellers, the thrust axis is the same as the rotational axis of the motor or engine crankshaft that drives the propeller. Rotational noise is characterized by harmonics that are based upon multiples of the frequency of propeller blade passage.

2) Vortex noise means that due to the multitudinous types of broadband noise due to various airflow vortices and irregular flow disturbances that are not part of rotational noise. Vortex noise includes that caused by blade tip vortices, trailing edge vortices, blade vibrations, turbulent (non-laminar) and separated airflow on the propeller or rotor blade's airfoil surfaces, and irregular airflow and air pressure disturbances caused by wind gusts, or by wakes or pressure fields due to bluff bodies that are nearby to the propeller or rotor.

Vortex noise is the dominant source of broadband noise. It has been defined as that sound which is generated by the formation and shedding of vortices in the flow past a propeller blade. The shedding of vortices that contribute to broadband noise from a rotating propeller's airfoil sections along the blade happens because there is a different velocity associated with each radial station along the span of a rotating propeller blade. The strength of the resulting acoustic radiation is proportional to the sixth power of the section velocity. Hence the vortex noise attributable to the high velocity sections near the propeller tip tends to be of greatest amplitude. A propeller blade develops vorticity whose strength (and noise) is proportional to the thrust that it is making.

Propulsion for aircraft basically depends upon accelerating a mass of air to increase its velocity, and the air's mass times its velocity determines the thrust. The noise produced in making a given amount of thrust depends upon whether it is made by accelerating a very large mass of air to a slightly higher velocity, or instead, by accelerating a very small mass of air to a very high velocity. The former (e.g. a large, slow-turning fan) is a much quieter way to make thrust than the latter (e.g. a turbofan or jet). Therefore, in high proximity aviation such as quiet urban air mobility, where noise is the foremost concern, the propulsion method of choice for making thrust will be with large diameter, slow-turning propellers. Moreover, the absolute amount of power and thrust required should be minimized in order to limit noise. Noise is measured in dB or decibels. A dB is a unit of measurement used to express the ratio of one value of a physical property to another on a logarithmic scale. Noise in dB increases in proportion to power according to the formula: dB increase=10× $\text{Log}_{10}(P_1/P_2)$, with $P_1$ and $P_2$ being the higher and lower power levels, respectively. If this formula were to compare a 2-seat aircraft of 150 kW to a 20-seat commuter aircraft of 925 kW, the noise increase would be 8 dB. This 8 dB increase, combined with the much larger runways and parking ramp areas inherently needed for the 20-seat aircraft, mean that much larger airport land parcels, with less proximity to where passengers live and work, would be required for the larger aircraft. This emphasizes that ultra-quiet propellers and rotors are most valuable and relevant to relatively low-powered aircraft, i.e., those of small size and that are lightweight, low-drag aircraft with small payloads and slow cruising speeds. When the absolute amount of thrust and rotational noise are low, as they must be with the ultra-quiet aircraft of high proximity aviation, vortex noise becomes a larger proportion of the total noise due to propulsion. This means that strategies that can reduce vortex noise become essential to creating ultra-quiet propellers.

Because vortex noise is exponentially related to blade velocity, doubling the blade velocity increases the noise by 18 dB. Doubling the blade area increases the noise by only 3 dB. Noise prediction formulae show that vortex noise is reduced most effectively by reducing the blade tip velocity. In general, when tip velocity is reduced, a given propeller's thrust will be reduced unless its blade area is increased. Increasing blade area increases blade thickness and noise. Noise prediction formulae show that the lowest noise strategy for increasing a propeller's blade area by a desired amount is by increasing the number of propeller blades rather than by increasing the area of its existing blades. However, as the number of propeller blades is increased, the area of each blade must become smaller in order to obtain the desired increase in total blade area. As each blade's area becomes smaller for a given blade diameter, its blade chord (i.e., the straight-line shortest distance from the leading edge to the trailing edge of the blade) and blade thickness both become smaller. This required decrease in blade area thus imposes a practical limit on how many blades can be added. That limit is reached when each blade's chord and thickness become so small that it cannot safely endure the structural and vibrational loads that it will experience during operation. The blade area minimum is also limited by the maximum amount of lift (i.e., thrust) that the slender blade can deliver. The relative slenderness of a propeller blade is determined by the ratio of its span squared divided by its exposed blade area, which is the parameter known as its aspect ratio. Wings and propeller blades of high aspect ratio, such as between 9 and 18, are slender and are inherently more efficient than those of low aspect ratio. This is why wings of high aspect ratios are employed on high performance sailplanes and long-range aircraft. Because high aspect ratio propeller blades are more efficient, they are the most quiet design for producing the relatively small amounts of thrust for the small aircraft of high proximity aviation. To be maximally quiet, these high aspect ratio propeller blades must have design features that increase their stiffness and dampen the vibration and vortex noise that could otherwise afflict such slender blades. An exemplary propeller may have an aspect ratio of 9, 10, 11, 12, 13, 14, 15, 16, 17 and 18, and any range between and including the aspect ratios listed.

Distributing the thrust load between the several blades on multi-bladed propellers reduces the load on each blade. This, along with operation at low tip speeds helps reduce the need for structural thickness in the root portion of the propeller blade where it joins the central hub. This is known as the propeller blade neck. Because all airfoils have a thickness that is proportional to their chord, this reduction in structural thickness helps enable the use of propeller blades with reduced chord near the neck. The neck of such slender blades must still be capable of enduring the bending loads that occur during maximum thrust generation on take-off. Care must be taken in the design of an ideal ultra-quiet, high aspect ratio blade that those bending loads are not increased by additional vibrational loads. The conventional method to dampen or avert propeller blade vibration is to make the blade thicker and of larger chord. In conventional high RPM propellers, relatively high thrust and centrifugal loading inherently demand greater blade thicknesses that tend to limit vibration. However, that strategy causes undesirable increases both the weight and the thickness noise of the propeller. To achieve the efficiency and ultra low-noise benefits of the high aspect ratio propeller blade while still controlling vibration and bending loads requires innovative new methods that are other than by general thickening of the blade.

The topic of propeller blade vibrations merits special discussion: The sources of excitation of vibration in the propeller blade can be any of the following:

A blade that is passing through a stream-tube of non-uniform inflow velocity, such as is caused by the induced slowing-down of the inflowing air at certain clock-hours of its rotation by the presence of a nearby fuselage, a co-axial, streamlined spinner or nacelle, or by the 'shadow' of a wing leading edge near the propeller disc. These bluff body influences can be either forward or aft of the propeller disc, depending upon whether it is a tractor or pusher propeller.

The angle at which a propeller blade's chord-line is tilted relative to the direction of air inflow is called its angle of attack. The direction of air inflow at each location along a propeller blade's span is mainly a function of the propeller's RPM and the forward speed of the aircraft on which it is flying. The actual air inflow direction is altered by an induced up-wash of airflow in front of the propeller blade itself, as well as by the local slowdown of airflow caused by bluff bodies near the propeller, such as a central spinner, motor nacelle or wing. A propeller's thrust axis, if it is passing through a stream-tube of air inflow at an angle other than the ideal angle of zero degrees (i.e., straight ahead), causes its propeller blades to experience a different angle of attack at each clock-hour of their rotation. Such differing angles of attack of the blade occur during off-nominal pitch or yaw angles of the aircraft. These different angles of attack impart differing amounts of lift and thrust on the blade as it goes through the clock hours of each rotation, causing a cyclic increasing and decreasing of loads on the blade. This cyclic loading tends to impart to the blade a rhythmic wobbling motion whose frequency is determined by the rotational speed of the propeller. There may be certain propeller rotational speeds at which the rhythmic motion's frequency matches the resonant vibration frequency of the blade, in which case an unstable, self-reinforcing increase of the amplitude of vibration can occur-one with potentially destructive consequences. Such resonant vibration also increases noise. One helpful remedy for this would be to conduct take-offs with full flaps so as to reduce the pitch angle of the aircraft during climb out, and thereby keep the propeller air inflow more closely aligned with its thrust axis. Alternatively, or in combination, a servo-controlled, gimbaled motor mount could be used to align the propeller thrust axis with the propeller air inflow during take-off and climb out, A similar strategy is employed on tilt-wing aircraft.

A blade or a portion of the blade that encounters a momentary wind gust from an inflow angle other than zero degrees can increase propeller noise. This can occur even during static operation on the ground.

A blade that receives excitatory vibration from wobbling engine power pulses or imbalance of the propeller blades, engine, motor or nacelle, or from their movement on resilient rubber mounts to the aircraft structure can increase propeller noise. Such vibration is minimized with smooth running electric motors.

A blade may vibrate due to inadequate stiffness. In general, vibration will be lessened if the blades can be kept extremely stiff by use of stiff materials and sturdy blade shapes. Sturdy blade shapes generally entail blades whose airfoils have a greater thickness-to-chord ratio. Minimizing vibration and resonance of the propeller blade structure can be accomplished by the following strategies:

Increase the blade resonant frequency

Remove or minimize the source(s) of excitation

Reduce the source(s) of excitation Decrease the blade resonant frequency

Use dynamic absorbers of vibration in the mounts of the blade, hub and/or motor

Use self-dampening materials (e.g., aramid fibers) inside the propeller blades

Reduce the time at the resonant frequency (e.g. invoke forbidden speed ranges)

Employ correct anti-phase vibration as an input to the system

Design extra stiffness at suitable intervals, span-wise, along the propeller blade so as to prevent or reduce resonant vibration Build the blade using carbon and aramid fiber with patterns, orientations and braiding arranged so as to obtain maximum blade stiffness and vibration damping.

Multiple research reports[2,3,4] have found a mysterious disparity between measured and predicted propeller noise, wherein typically the noise measured exceeds that predicted. One possible explanation for this mismatch is that the noise due to propeller blade vibrations was not adequately accounted for. Another possible explanation is that the noise due to propeller blade tip vortices or that due to non-laminar, turbulent and separated airflow on the propeller blade is not adequately accounted for. An effective and comprehensive breakthrough in ultra-quiet propulsion must quell propeller noise from all of these potential sources.

Future electrically powered aircraft that are quiet enough to operate at very small, high-proximity neighborhood airparks will require specialized propellers whose foremost design goal must be noise reduction. Rather than optimizing the propeller for efficient cruise flight, as is typically done with conventional aircraft propellers, ultra-quiet aircraft propellers must be optimized for minimum noise emissions during the high thrust operations of take-off and initial climb. It is only during take-off and initial climb that the aircraft will be close enough to the areas where people live and work that its noise emissions are critical. This design priority imposes new constraints on propeller design because of the slower airspeed, high thrust and nose-up pitch attitude typical of the aircraft during take-off. The purpose of this invention is to meet all of these constraints with a comprehensive solution that combines noise-reducing innovations. The constraints can be identified as follows:

Scientific surveys of airport noises as well as federal noise limits in quiet areas[6] indicate that future quiet aircraft will need to keep their noise emissions below about 48 dBA at the airpark perimeter fence, a sideline distance that is likely to be less than 40 meters (132 feet) from the aircraft. To accomplish such extremely low noise emissions will require new types of propellers with a combination of several specialized features. These features will include having several blades of high stiffness, each with astutely tailored blade twist angles, very low tip speed, low disc loading, ideal span-wise airfoil selection, ideal thrust distribution and high aspect ratio. To be ultra-quiet, aircraft propeller blades must be stiff enough to be resistant to blade vibrations that make noise, or that flutter or resonate. In addition, the size and intensity of any vortices that emanate from the propeller, especially the tip vortices, must be minimized in order to reduce noise. In an embodiment, the propeller noise caused by off-nominal blade angles of attack, whether due to gusts, to off-nominal airspeeds or to off-axis air inflow angles must also be minimized as much as possible.

The low frontal area of electric motors compared to other sources of propulsion affords the use of very streamlined motor nacelles, which, in combination with a streamlined axial spinner, can greatly reduce the size of the large regions of 'slowdown' of airflow that typically occur in front of the broad nacelle or cowling of a piston engine. This low frontal area with electric propulsion allows new opportunities for enhancing the performance of the innermost portions of the propeller blade, a site where much drag, vorticity and noise would originate in prior designs with large nacelles. That enhancement combined with the others in this invention can help enable new achievements in ultra-low-noise propulsion.

The extremely strident noise constraints for the propellers of high proximity aviation constitute a new domain for propeller design; one that demands a comprehensive approach in order to succeed. Therefore, the essence of an exemplary embodiment of this invention is to combine propeller design innovations with strategies of both design and of operation that together comprise a complete methodology that will maximally reduce propeller noise during take-off. These innovations and strategies are best presented after the section on propeller design and nomenclature that follows.

The understanding of the innovations in this invention requires a brief review of relevant propeller nomenclature and aerodynamics:

Relevant Propeller Nomenclature and Aerodynamics:

An airfoil-shaped wing, when moved through air at an appropriate angle, produces an aerodynamic force. The component of this force that is perpendicular to the direction of motion is called lift, while the component parallel to the direction of motion is called drag. A wing that is generating lift in this way does so by basically throwing air downward, against which action the equal and opposite reaction according to Newtonian physics is the lift force imparted to the wing. A propeller blade that is generating thrust is similar to a wing, in that it too throws air in order to create the opposite reaction of a thrust force imparted to the blade.

As the wing, or propeller blade's airfoil shape, moves through a mass of air, the air is directed to move around the airfoil's curved surfaces. The width of an airfoil from front to back is called its chord. The chord is the distance of an imaginary straight line that connects the front of the airfoil to its rear edge. The front of the airfoil is called its leading edge. The rear edge of the airfoil is called its trailing edge. An airfoil's top or upper surface is typically curved or cambered with an upwardly convex shape. That same airfoil's bottom or lower surface is typically flat or less convex than the upper surface and often has a downwardly convex shape. The mean camber line is the line drawn through all the points that are half way between the airfoil's upper and lower surfaces. The mean camber line serves as a relative indicator of how much lift an airfoil can produce. The more the mean camber line lies above the chord-line, the more lift that airfoil will tend to produce for a given angle of attack. A symmetrical airfoil is one whose upper and lower surfaces are identical in shape and are equidistant from the chord-line, making them mirror-images of each other. A symmetrical airfoil's mean camber line is thus a straight line coincident with its chord-line. A symmetrical airfoil can therefore be said to have zero net camber. More camber on the upper surface means that airfoil will direct air to move first upward and then downward relative to the airfoil's direction of movement. This imparts a somewhat downward angle to the air as it flows past the trailing edge of the airfoil. This downward angle of airflow depends upon several factors, but mainly upon the airfoil's mean camber line and its tilt angle relative to the direction of air inflow. This tilt angle of the chord-line is called the angle of attack or alpha ($\alpha$). Other angles with respect to wings, airfoils and propellers are: yaw angle: that angle measured about the wing's vertical axis, or thrust axis if for a propeller blade airfoil, and between the chord-line and the airfoil's direction of movement; sweep angle for an aircraft wing: that angle that lies between a straight line from root to tip whose points all lie aft of the wing leading edge by a distance that is 25% of the total local chord distance, and a 2nd straight, span-wise line perpendicular to the longitudinal axis of the aircraft; beta ($\beta$) angle: the angle, typically diminishing at each point along the span of the propeller blade, between the blade chord-line and the imaginary plane of the propeller disc; phi ($\phi$) angle: the actual advance angle of the propeller blade, and nominally equal to $\beta-\alpha$; and blade twist: for propeller blades, the difference in beta angle between two points along the blade. See FIGS. 8, 10 and 11, which depict the various blade airfoils along the span and their respective blade angles. The blade station refers to a specific location along the span of a propeller blade and is typically defined as the ratio r/R with r being that blade location's radius relative to the total blade radius R, which R is the distance from the thrust axis at the center of the propeller hub to the outer tip of the blade. Thus, a blade station of 0.2R would describe a blade station whose radial location was 20 inches (50.8 cm) outboard of the thrust axis of a blade of 100 inch (254 cm) total radius (20/100=0.2). Alternatively, for a propeller of specific known radius R, a blade station may be defined as the specific number of inches or millimeters measured radially along the blade outward from its central thrust axis. Accordingly, in the foregoing example of a blade for which R is 100 inches (254 cm), the blade station of 0.2R could also be called the 20-inch (50.8 cm) blade station or the station at 20% of blade span. The center point is defined as the point that is equidistant from an airfoil's leading and trailing edge and half way between its upper and lower surface.

The sweep angle of a propeller blade is a special case requiring a specific definition to be used herein. It is measured as the angle between an imaginary straight line drawn from the propeller thrust axis radially outward in the plane of the propeller disc and passing through the center point of the blade airfoil at the 0.75R blade station and a second imaginary straight line drawn from that same center point of the blade airfoil at the 0.75R blade station and the center point of the blade tip.

A conventional propeller, or rotor, includes two or more blades connected to a central hub. The hub rotates on a shaft whose axis is coaxial with the thrust axis of the propeller. This shaft is driven either directly by an engine or electric motor, or through a device, such as a gearbox or belt and pulley system, that reduces the propeller rotational speed relative to the engine or electric motor rotational speed. Propellers can operate at variable revolutions per minute or RPM, and these RPM, along with the forward airspeed of the aircraft, determine the direction and magnitude of the airspeed at each span-wise station along their blades. In general, fewer RPM generate less propeller noise.

Propellers advance at the forward speed of the aircraft on which they are mounted and their blades travel forward along a helical path that is determined by the vector sum of their revolutions per minute and the forward speed of the aircraft. The forward distance that would theoretically be traveled through a solid block of material by any point on a propeller blade during one complete 360° rotation of the propeller shaft is called the propeller's pitch. In normal operation, due to slip, the propeller blade's forward distance traveled during one complete 360° revolution will be a bit shorter than the theoretical geometric pitch of the propeller.

The portion of the propeller blade inside the hub and closest to the thrust axis at the center of the hub is called the root of the blade, and the outermost extremity of the blade farthest from the hub is called the tip of the blade. The neck of the blade is that inner portion just outside the hub.

Outboard, as used herein refers to a relative position along the propeller blade that is more proximal to the tip. Inboard, as used herein refers to a relative position along the propeller blade that is more proximal to the root of the blade.

A cross-section at any blade station along a propeller blade, taken as a chord-wise slice through the blade and perpendicular to the imaginary propeller disc, will typically reveal the shape an airfoil. See FIGS. 8 and 12, which depict blade airfoils and angles along the blade for the case of clockwise and counterclockwise rotations, respectively, with these rotations being those seen by an observer from a vantage point aft of the propeller disc.

The airfoil, at each station along the blade, will have a shape designed for both adequate structural strength and so as to produce the ideal amount of local lift. The airfoil, at each station along the blade, will also have a specific blade angle (beta or $\beta$) that is measured relative to the plane of the propeller disc and that is mainly determined by the propeller pitch, which is defined above. However, the exact ideal value of l at each blade station is also determined by several other factors, as described below.

A propeller blade is technically comprised of continuously changing airfoil shapes along its span. However, more practically, a blade's actual shape is defined by a smooth blending together of a finite number of carefully selected airfoil shapes appropriate to their span-wise location. The airfoils near the neck of the blade are typically much thicker than those used at mid span or near the tip because the bending loads are much larger at the neck. The airfoils near the neck also have larger beta angles than those that are more outboard.

The chord length of the airfoil used at each station along the span of a propeller blade is a key design parameter and it will typically scale with the total length of the blade's radius, R. The exposed aspect ratio of a propeller blade can be defined as its exposed blade radius squared divided by the planform area of the exposed blade, which is termed the exposed blade area. The term exposed blade refers to that portion of the blade that is outside of the central streamlined spinner, which spinner encloses the central hub. The term planform means a top view of a 2 dimensional shape and the term planform area refers to the surface area of the planform of the untwisted blade.

Generally, the aspect ratio delineates how slender is a propeller blade. The activity factor of a propeller blade is a similar parameter that is basically determined by a mathematical integration that quantifies the blade's ability to absorb power, by calculating a summation of the ratios of its local chords to local radii at each radius along the blade. Blades with high activity factor are of wider chord and can absorb more power. Ultra-quiet propeller blades will be slender, high aspect ratio blades of low activity factor.

Some propellers have blades of zero sweep angle, whose 50% chord locations at each span-wise station align with an imaginary straight span-wise radial line drawn outward from the axial center of the propeller blade's cylindrical root in the hub. Others use blades whose chords are mostly forward or aft of that span-wise radial line, which thereby create either forward or aft sweep of the blade, respectively. Sweep angles that are non-zero tend to promote unwanted span-wise airflow and decrease chord-wise airflow. Purposeful lift or thrust is created only by the chord-wise component of airflow and span-wise airflow therefore represents wasted energy. This generally means that blades that maximize chord-wise airflow will have greater efficiency and less noise.

The surfaces of the different airfoils used along the span of the non-swept, axi-symmetric propeller blade are typically smoothly blended together. The axial center of the propeller blade's cylindrical root inside the hub is the axis about which the hub, if it is a controllable pitch hub, can rotate the propeller blade to change its pitch. That axis will generally pass through each airfoil of an axi-symmetric propeller blade at a central point (the center point) located at the intersection of a point that is half way from the airfoil's upper surface to its lower surface at the airfoil's 50% chord location. However, depending upon the shape transitions between adjacent airfoils, this intersection point may be slightly different from this center point if analysis by computational fluid dynamics (CFD) software tools indicate such alteration would be beneficial to reducing noise or span-wise flow. For each airfoil depicted in the preferred embodiment of this invention in FIGS. 8 and 11, this center point is shown as a + symbol.

Every airfoil along the propeller blade has an operating Reynolds number that is determined mainly by the airfoil's chord and the velocity of the local airflow. The Reynolds number of an airfoil is dimensionless and is defined by the following equation: $RN=cV/v$. where RN is the Reynolds number, c is the chord length of the airfoil, V is the airflow velocity or airspeed relative to the blade at the airfoil's span-wise location on the blade, and, v, pronounced nu, is the kinematic viscosity of the air. In practical terms, the formula at standard sea level air density is $RN=9354*chord$ in feet*local blade helical airspeed in mph. The nominal Reynolds number for a propeller is conventionally specified as that occurring at the three-quarter span or the location on the blade where $r/R=0.75$, which is also the 0.75R blade station. Airfoil performance in terms of lift and drag varies substantially as a function of the airfoil's Reynolds number. Accordingly, the chord of the blade and how fast the blade moves through the air determine the blade's performance. In general, blade airfoil performance, in terms of lift and drag coefficient, improves substantially as Reynolds numbers rise above 500,000. This fact favors the performance of propeller blades of relatively large chord operating at higher RPMs, and poses a design challenge for ultra-quiet propellers that must have slender blades of small chord that operate at very low RPMs, where Reynolds numbers are well below 750,000 at the 0.75R blade station, such as no more than about 600,000, no more than 500,000, about 250,000 or more and any range between and including the values provided. Consequently, ultra-quiet propellers may utilize airfoils that are specially designed to operate at lower Reynolds numbers that are in the range of 150,000 to 750,000 at the 0.75R blade station.

Combining the selection of appropriate low Reynolds number airfoils with the selection of appropriate blade angles in order to produce the maximum thrust performance necessary during take-off are two of the innovations that are included in this invention. The selection of the optimum blade angle, R for each station along the blade's span must account for several factors. These factors include the propeller's pitch, the station's airfoil and its lift coefficient versus angle of attack characteristics, the lift coefficient needed to produce the required local thrust, the locally induced air inflow velocity vector, and the local slowdown of airflow caused by the airframe or nacelle bluff bodies near the propeller. This complex selection process for (is best performed by any of several propeller design software tools that can simultaneously account for all of these factors. In the present invention, this complex selection process aims to optimize the blade angle at each blade station, not for the cruise condition but rather for the highest practicable (non-stalled) local lift coefficients at the airspeed and RPM that pertain at lift off. Biasing the propeller blade angles for the take-off condition is a process that deliberately subjugates cruise performance and propeller efficiency for the sake of reducing take-off noise. The series of blade angles, $\beta$ for each blade station along the blade span are selected to produce the maximum thrust performance necessary at lift-off speed during take-off and are consistent with the propeller's pitch, the local airfoil's lift and drag coefficients versus angle of attack characteristics, the locally induced air inflow velocity vector, and the local slowdown of airflow caused by the airframe or nacelle bluff bodies near the propeller. The preferred and most accurate method of selection of this series of blade angles is through computer analysis, using propeller design software tools such as FEMAP version 12 by Siemens and CFD Enterprise and Discovery AIM by ANSYS, that can simultaneously account for all of these factors while tailoring the blade's relative thrust distribution to be the preferred ultra-quiet one. These 1 angles must not only take into account the required local thrust that will conform to the preferred ultra-quiet relative thrust curve shown in FIG. 2, they must also be tailored to minimize span-wise airflow along the blade. In the present invention, the final blade angles (FBA) are based upon a definite set of criteria as follows: 54 mph lift off speed, 650 RPM, and a 10 feet diameter propeller whose pitch is thereby 7.31 feet per revolution. The propeller is comprised of 7 high aspect ratio blades with a span-wise series of airfoils whose FBAs are selected such that the sum of the lift and thrust produced at those angles by their respective lift coefficients will deliver a total of 509 pounds thrust with 75 kW of power. The defining FBAs arrived at for these conditions are for a particular aircraft and are those shown in the sequence of airfoils in FIGS. 8 and 12 and in Table 2. Note that for the same aircraft at cruise conditions with 336 RPM and 120 mph, the geometric pitch becomes 31.43 feet per revolution, which demands that the blade angles be substantially increased. That large increase in blade angle can be accomplished by a controllable pitch propeller hub, which has the capability to rotate each propeller blade around its long axis by an identical amount and thereby change the blade angles to be at or near those appropriate to the pitch in the cruise condition. A number of different hubs made by different manufacturers could accomplish such pitch changes for the ultra-quiet propeller. From the foregoing it is apparent that each different aircraft that uses this invention's strategies for ultra-quiet propulsion will have a definite set of appropriate FBAs based upon its operating conditions during take-off, i.e. lift-off speed. RPM, power, thrust required.

It can be shown that the propeller design parameters necessary to minimize noise have design and operational limitations that are irrevocably interrelated. See FIG. 3. (RPM v fps v RN) The largest propeller diameters that can realistically be used on ultra-quiet small aircraft of 2-4 seat capacity are constrained by the limitations of propeller tip ground clearance, propeller weight, gyroscopic and centrifugal loads, blade tip speeds, induced pitching moments and Reynolds number. These constraints generally limit such propellers to diameters of less than 14 feet and greater than 7 feet. Recent research[7,8] has shown that propeller blade airfoils do not perform well if operating at below Reynolds numbers of 100,000. Even at Reynolds numbers of 250,000, airfoil performance is noticeably degraded from that which obtains at RN 750,000. The low noise goals that compel the use of large diameter propellers with multiple blades (e.g. 6 or 7 blades) of high aspect ratio, while operating at low RPMs and flying at airspeeds below 180 mph, mean that these propellers must operate at low Reynolds numbers. This, in turn, means that the propeller should employ airfoils that are specifically designed to operate at low Reynolds numbers. The interplay of these parameters is shown in See FIG. 3. (RPM v fps v RN)

See FIG. 4. (airfoil pressure gradients) Static pressure is defined as the pressure of air that is not moving. If air pressure measurements are taken at points along the forward part of the upper surface of a wing's airfoil while it is producing lift, it will be found that those local pressures are lower than the ambient static pressure, which causes them to be generally referred to as 'negative pressures'. At other locations, such as near the trailing edge of the lifting wing's bottom surface where the dynamic pressure due to velocity adds to the ambient static pressure, the local surface pressures are typically higher than the ambient static pressure, which causes them to be generally referred to as 'positive pressures'. Fast-flowing air produces localized negative pressures, and the faster the air-flow, the more negative the local pressure. Because the local relative airflow velocities across an airfoil vary at each point along its surfaces, a so-called 'pressure gradient' exists along those surfaces. During flight with a wing at a positive angle of attack, a wing's pressure gradients typically consist of negative pressures on its forward upper surface, and pressures that become less negative near the rear portion of the upper surface. Likewise, the positive pressures on the forward portion of its lower surface become less positive toward the rear of the lower surface. A graph showing some typical airfoil pressure gradients of airfoils flying at a 5° angle of attack is depicted in FIG. 4. The term Cp refers to the pressure coefficient, which is a dimensionless number that compares the relative amount of local pressure to the free-stream dynamic pressure. It can be expressed by the following formula:

$$Cp = \frac{p_o - p_\infty}{1/2 \times rho \times V_\infty^2}$$

where:
  $p_o$ is the local pressure,
  $p_\infty$ is the free-stream static pressure,
  rho is the local air density,
  and $V_\infty^2$ is the square of the velocity of the body through the air.

When analyzing the direction in which air wants to flow at any location on a wing or propeller blade, it can generally be expected that the air will flow from positive pressure regions toward negative pressure regions, just as occurs with weather systems. This directionality is shown by the arrows in FIG. 4, which indicate that an unwanted span-wise flow would occur between the two adjacent airfoils depicted in the graph. Ideally, curvatures on wings and propeller blades should be designed so as to encourage air to flow in a chord-wise direction rather than in a span-wise direction because it is only the chord-wise airflow that produces lift or thrust. Thus, different airfoil shapes used side by side along the span of a wing or propeller blade should be selected with care and blended so that the curvature of their adjacent surfaces and the speeds of air flowing over them do not cause local span-wise surface pressure differences that would result in unwanted span-wise air flow. This airfoil selection process is preferably accomplished using computational fluid dynamics (CFD) software tools. CFD can model and select preferred airfoils for an optimal propeller.

A key element in propeller design is the selection of the ideal airfoil shape and blade angle for each span-wise location along the blade. That selection process is driven by the requirements of both providing adequate structure, and providing the necessary local thrust while also maintaining smooth shape transitions along the span of the blade. For best efficiency, the airfoils so selected must be blended 'shoulder-to-shoulder' span-wise along the blade such that the tailored differences in relative airflow velocities along their adjacent upper and lower surfaces will minimize span-wise airflows and the noise-making mini-vortices that result from them. This selection process requires the use of CFD software tools.

This airfoil selection process is made more difficult and complex because the blade's local airflow velocities progressively increase due to the greater distance traveled per revolution at successively more outboard span-wise locations along the blade. Moreover, the local airflow dynamic pressure at each of these successively more outboard locations rises exponentially, i.e., as the square of the local airflow velocity. Because the local blade lift is determined by the product of the local dynamic pressure times the local lift coefficient times the local blade area, the exponentially increasing dynamic pressure means that the amount of local lift at each successively more outboard location will tend to increase exponentially. And because the forward vector of the local lift determines the actual local thrust, the local thrust likewise tends to increase exponentially. These exponential increases in lift and thrust generally require a progressive reduction in blade cross-sectional area by tapering the blade chord at successively more outboard locations on the propeller blade. These tapered areas must however avoid excessive reductions in blade stiffness that could lead to flutter or resonant vibration. The use of Fibonacci intervals to determine the ideal blade stations at which to apply calculated stepped changes in local blade stiffness accomplished by local changes in cross-sectional area or by local changes to the internal blade structure, or both, provide an innovative new way to avoid blade flutter and resonant vibration and thereby reduce noise.

A special airflow situation exists at a wing's tip or at the tip of a propeller blade. Here, whenever the wing or propeller is making lift or thrust, the fast-flowing air on the upper surface has a negative pressure while the slower flowing air on the lower surface has a positive pressure. The result of this is that air from the lower surface positive pressure region tries to flow span-wise toward the outer edge of the wingtip where it can leak span-wise off the tip and spiral upward onto the wingtip's upper surface where there is negative pressure. This upward curling of airflow at the tip is what produces the conventional wing's tip vortex. It also produces the conventional vortex at the tip of propeller blades. These tip vortices make noise and diminish the efficiency of the wing or propeller blade. Reducing or eliminating these vortices can be expected to yield less noise and greater efficiency.

Airfoils with greater amounts of convex upper surface curvature relative to their lower surface curvature are said to have positive camber. The greater the difference between upper surface curvature and lower surface curvature, the greater the camber. As mentioned, an airfoil's mean camber line is the line that bisects the distance between the airfoil's upper and lower surface, and is drawn from the leading edge to the trailing edge of the airfoil. If the airfoil's upper and lower surfaces have identical curvatures, it is said to be a symmetrical airfoil that has zero camber because its camber line is a straight line. Such symmetrical airfoils only generate lift if tilted at a positive (nose-up) angle of attack.

Large amounts of camber generally occur in airfoils that can generate large amounts of lift, or, in the case of a propeller blade airfoil, large amounts of thrust. The amount of lift that an airfoil can produce at a given angle of attack is quantified by a dimensionless number, which is known as the lift coefficient. The lift coefficient or Ct for a wing is defined as the wing's lift divided by the product of the free-stream dynamic pressure times the wing area. The free-stream dynamic pressure is determined by the formula: 0.5× air density x the square of the free-stream velocity in feet per second. An airfoil's lift coefficient is typically proportional to the airfoil's angle of attack up to a large, limiting angle of attack known as the stall angle of attack. At this large angle of attack where the airfoil is said to reach stall, the airflow separates from the upper surface of the airfoil and does not follow its curvature. Instead, the separated airflow forms a swirling vortex on the wing's upper surface that results in noise and much less lift. As a consequence, this stalled condition is undesirable for both wings and propeller blades. As angles of attack increase beyond the large, limiting angle of attack where stall begins, the lift coefficient typically stops rising and instead levels off or diminishes precipitously, losing its predictable proportionality to angle of attack. As the angles of attack increase beyond stall, if the lift coefficient merely levels of T and only slightly declines, the airfoil is said to have docile stall characteristics. Because during take-off propeller blades on controllable pitch propellers typically rotate their blades to large angles of attack that may approach or even exceed the stall angle, airfoils with docile stall characteristics can offer more predictable, effective and quieter operation on such propellers.

A propeller blade normally should operate at a modest angle of attack that produces a lift coefficient of about 0.5 in cruise flight. However, as the blade approaches the stall angle of attack, it may operate at a lift coefficient as high as 1.5 or more when making maximal thrust, such as during take-off and climb. The take-off regime is the one in which the airfoil that has docile stall characteristics confers a more stable behavior to the airfoil and causes it to be more resistant to abrupt and noisy flow separation. See FIG. 5, where a range of typical lift coefficients is shown relative to the angle of attack that produces them.

Thrust distribution: According to the classically accepted mathematical theory of ideally efficient propeller blade design known as the conventional minimum induced loss Betz-Goldstein-Theodorsen or BGT Theory, there is an ideal relative thrust distribution along a propeller blade that results in a constant thrust to torque ratio along the blade, which confers ideal blade efficiency, with efficiency defined as the maximum thrust per kilowatt of power consumed. This ideal relative thrust distribution is the propeller that evenly converts torque to thrust all along its span. When shown graphically, this ideal relative thrust distribution has a half-teardrop shape. See FIG. 2. It is typically sought by mathematically selecting the sequence of propeller blade airfoils, their blade angles and dimensions for maximum efficiency and a relative thrust distribution to occur at the aircraft's cruise airspeed and RPM. However, as will be shown in FIG. 5, (CL alpha curve portions) in this embodiment of this ultra-quiet propeller invention, the design process instead aims to optimize the propeller's ratio of thrust to noise at the take-off airspeed and RPM while not unduly upsetting its cruise efficiency. Also, in the present invention, the ideal relative thrust distribution of the conventional minimum induced loss BGT Theory is changed as shown in FIG. 2, so as to include greater thrust on the portions of the blade that are inboard of the 0.75R blade station and to include less thrust on the portions of the blade that are outboard of the 0.75R blade station, including a small region between the 0.93R and 1.0R blade stations where the progressive reduction in thrust actually transitions into negative (below zero) thrust at blade stations approaching the tip. Blade span is defined herein as the distance that is one half of the propeller diameter and is equal to the span-wise radius, "R", of the blade, and which is measured from the blade tip to the center of the hub, which center also lies on the thrust axis of the propeller.

The purpose of the negative thrust at the tip is to create a 'reverse vortex' to oppose and reduce the size and intensity of the conventional tip vortex. This negative thrust can be achieved by either using a progressively smaller, i.e., more nose-down, blade angle in the region outboard of the 0.93R blade station near the tip, so as to progressively reduce the local blade angle of attack or, alternatively by using in this same location, an airfoil shape whose negative camber makes negative lift or by a combination of these two strategies. See FIG. 2 for exemplary relative thrust contours and FIGS. 8, 11 and 12 for exemplary airfoil angles. The term nose-down refers to the leading edge region of the blade airfoil as being the nose of the blade and to a local blade twist that reduces the local blade angle of attack as being in the down direction.

For electrically powered aircraft, the axi-symmetric small diameter motors used for propulsion will have a much smaller frontal area than a piston engine. The can allow for much more streamlined nacelles that can be faired smoothly with the streamlines of the propeller spinner. The propeller spinner is the central, axi-symmetric, streamlined nose-cone that typically fits in front of and covers the propeller hub. Its blade slots should fit closely to the propeller blade's innermost inboard airfoil allowing just enough space for the hub to rotate the blade through its full range of pitch change movements. The vortex in the blade neck region can be greatly reduced if the fit of the spinner blade slot to the blade's innermost airfoil is kept snug and the spinner surface is kept nearly perpendicular to the long axis of the blade. By perpendicular, is meant that, from the point where the leading edge of the propeller blade emerges from the spinner to the trailing edge of the blade, the spinner surface contour in the direction parallel to the thrust axis is kept nearly cylindrical. It is the aim of this invention that, for the ultra-quiet propeller, the spinner size, shape and blade slots are integrated with the innermost propeller blade shape in this way.

The transition from the propeller neck's cylindrical shape into an actual airfoil shape can be accomplished in a shortened span-wise distance for electrically driven propellers of low RPM because the rise and fall in the application of torque are much smoother than would occur in a piston engine and the centrifugal loads are lower. This is important because it allows the blade root to transition from its round root shape in the hub to become an effective thrust-generating airfoil before the blade emerges radially from the streamlined spinner. The abutment of the blade's innermost airfoil with the spinner skin effectively provides a flow 'fence' to limit the size and intensity of the blade's inner vortex there, further reducing noise.

The Vortex Reducing Thrust Distribution Strategy (VRTDS)

Most conventional propeller blades are designed in accordance with the conventional minimum induced loss Betz-Goldstein-Theordorsen (BGT) model. However, a propeller exemplary of the present invention incorporates strategic and unique changes to such a conventional propeller blade shape and thereby to its relative thrust distribution in order to reduce noise. These changes include, but are not limited to: 1) changing the conventional minimum induced loss BGT model of relative thrust distribution that normally guides efficient propeller design by increasing the relative thrust for the portions of the blade that are inboard of the 0.75R blade station and decreasing the thrust for the region outboard of that 0.75R blade station, including progressively decreasing the thrust to below zero in the region of the propeller blade stations from 0.93R to 1.0R; see the graph in FIG. 2 and FIGS. 8, 11 and 12) accomplishing these changes so as to produce a continuous reduction in thrust, which may be a linear reduction or a non-linear reduction, to reach negative (below zero) values of thrust at or proximal to the tip. This below zero thrust at the tip produces a local airflow vortex, whose flow direction opposes and thereby diminishes that of the conventional tip vortex and thereby provides a reduction in noise. This deliberate negative thrust also helps reduce the bending moment on the blade neck.

An exemplary propeller produces up to 20% greater local relative thrust, up to 15% greater local relative thrust, up to 10% greater local relative thrust or up to 5% greater local relative thrust than that of a conventional minimum induced loss BGT propeller on the portions of the blade that are inboard of the 0.75R blade station. In addition, an exemplary propeller may have a progressive and continuous reduction in relative thrust from the 0.75R blade station to the 1.0R blade station at the tip, wherein, in the blade region from 0.93R to 1.0R, the reduction in relative thrust may reach up to 135% of the maximum of 100% of relative thrust of a conventional minimum induced loss BGT propeller. This means that in an exemplary embodiment, in the blade region from 0.93R to 1.0R, the relative thrust becomes negative. In an exemplary embodiment, the relative thrust in the region from 0.93R to 1.0R may be 135% or less, 125% or less, 115% or less, 110% or less than that of a maximum of 100% of conventional relative thrust of a minimum induced loss BGT propeller. This inboard and outboard redistribution of thrust reduces noise produced by the propeller. An exemplary propeller with the thrust distribution described herein also produces a sufficient thrust for take-off.

The Fibonacci Strategy

From the propeller tip moving inward along the blade toward the hub, a strategy of applying calculated stepped changes in local blade stiffness accomplished by local changes in cross-sectional area or by local changes to the internal blade structure, or both, at span-wise locations at intervals that are determined by calculating a Fibonacci series that places the stepped changes in-between the known nodes of vibration modes 1, 2 and 3 and is herein called the Fibonacci strategy. In an exemplary embodiment of the ultra-quiet propeller, the Fibonacci strategy is used in combination with the Vortex Reducing Thrust Distribution Strategy (VRTDS). See FIG. 1. The purpose of the series of stepped changes used in the Fibonacci strategy is to selectively stiffen the blade in a way that dampens the largest amplitude blade vibrations, increases the blade's resonant frequencies, and maintains as much chord-wise air flow as possible in order to reduce noise.

The Synergistic Noise Reducing Strategies (SNRS)

In an exemplary embodiment, the following synergistic noise reducing strategies are used in combination with the VRTDS and the Fibonacci Strategy in order to maximally reduce propeller noise:

a) propeller blade tip speeds kept below 500 feet per second FIG. 3;

b) large diameter propellers with between 4 and 10 blades of high aspect ratio FIG. 3;

c) customized blade airfoils with high lift coefficients at low Reynolds numbers FIGS. 3, 7, 8 and 12;

d) laminar flow airfoils that reduce the noise from turbulent and separated flow;

e) span-wise airfoil and blade sweep changes that reduce local span-wise pressure gradients FIG. 4;

f) blade airfoils with high lift capabilities and docile stall characteristics FIG. 5;

g) blades with shortened necks whose innermost non-airfoil portions are fully enclosed by an axisymmetric streamlined spinner whose shape is cylindrical across its aft region from which the innermost blade airfoil emerges FIG. 6;

h) relatively thick airfoils for blade stiffness and vibration resistance FIG. 7 (blade), 8 and 12 (airfoils);

i) spread-tow and conventional carbon fiber and carbon nano-fiber (CNF) composite blades for extra stiffness and light weight;

j) aramid fibers as a blade's core material, applied in a span-wise spiral braid that dampens vibration;

k) between 4 and 10 blades (inclusive) in a fast-acting, controllable-pitch multi-blade propeller hub; and l) abruptly tapered fillet shape change from blade airfoil at the spinner surface to a round blade neck at the outer edge of the hub FIG. 9.

To fulfill the extreme requirements of acceptable community noise levels in high proximity aviation, the ultra-quiet propeller should reduce all of the sources of propeller noise. It follows therefore that all of the innovations and strategies described in this herein are important, relevant and may all be required to meet the goals of an ultra-quiet aircraft. Likewise, the use of any one of the invention strategies described herein, may be sub-optimal in noise reduction and may not produce a propeller that meets noise requirements.

The first noise-reducing innovation in this invention is to employ strategic changes to the propeller blade shape and twist in order to alter the conventional thrust distribution that normally guides efficient propeller design. These changes include ones that increase the thrust for the inner portions of the blade and decrease the thrust for the outermost area of the blade. See FIG. 2. (thrust distribution)

These changes to thrust distribution are accomplished by selecting airfoil sections, blade twist angles, blade chord sizes and blade sweep angles that alter the levels of thrust at each span-wise propeller blade station. In particular, they include the deliberate, marked reduction in blade angles in the outermost tip portion of the propeller blade so as to create a localized purposeful vortex whose direction of rotation is opposite to that of the conventional tip vortex. This purposeful 'reverse vortex' is intended to oppose and thereby reduce the energy, size and noise of the oppositely rotating conventional tip vortex. This localized purposeful vortex is created because the reduced blade angles at the tip portion of the propeller blade are causing it to make drag instead of thrust in that region of the blade. The strategy of making a small amount of drag locally at the propeller tip comprises a deliberate sacrifice in propeller performance and efficiency that is worth doing because it can substantially reduce the largest component of propeller noise at low tip speeds, which is typically that due to the conventional tip vortex. The details of the ideal application of this strategy will vary slightly with the differing blade geometries of one ultra-quiet propeller design versus another, but the principle will remain the same. The ideal amount of blade span at the tip that can be sacrificed to form this zone of negative thrust and reduced tip loading will range up to as much as 7% of the blade radius, thereby encompassing blade stations 0.93R to 1.0R. Reduced tip loading can be achieved by either reducing the tip's blade angle or by using airfoils at the tip that have negative camber (i.e., whose lift is directed toward its lower surface) or by a combination of these methods. This strategy represents a new domain for achieving reduced propeller noise. The ideal shape by which it is accomplished can best be determined using CFD and FEMAP software tools for the particular propulsion system involved. The reduced tip loading that results from this strategy will ease the bending loads on the propeller neck and will help dampen blade vibrations. One badge that will distinguish this invention strategy from conventional propeller designs will be the progressive and continuous local reductions in blade angles in the outermost region of the blade, which angles reduce the local thrust to below zero. These strategies of reducing tip loading may in some cases be enhanced by also using non-zero blade sweep at the blade tip.

The modest increase in relative thrust, compared to the BGT minimum induced loss propeller, for the portion of the blade that is inboard of blade station 0.75R and is shown in FIG. 2, serves several purposes. It increases thrust to help make up for the reduction in thrust at the tip. It can increase the velocity of the inboard portion of the propeller wake as it wafts over the main wing of the aircraft, where with wing flaps extended it can substantially enhance aircraft lift. It increases the blade angles of the inboard portion of the blade, which enhance the blade's efficiency, stiffness and resistance to vibration.

Exemplary blade sweep angles may be zero or range from no more than 10° in the forward or aft direction, wherein aft sweep is herein defined as being a positive (+) number of degrees and forward sweep is defined as being a minus (−) number of degrees.

Propeller blade stiffness innovation: The Fibonacci strategy. The second innovation of this invention is the strategy of applying calculated stepped changes in local blade stiffness accomplished by local changes in cross-sectional area or by local changes to the internal blade structure, or both, at specific stations along the propeller blade from its tip toward its neck. Such stepped increases in blade stiffness may be accomplished by modifying either the blade's wall thickness, internal ribbing, internal bulkheads or core structure, cross-sectional area, airfoil shape, thickness or chord. This strategy is called the Fibonacci strategy and its stepped increases in blade stiffness are designed to dampen blade vibrations and thereby, noise. The innovation used here is based on the physics of standing waves, resonance and vibration modes along a cantilevered beam, which in this case is the propeller blade. Abrupt discontinuities in blade stiffness that are strategically placed at calculated intervals along a propeller blade will alter its local bending resistance in ways that can reduce the amplitude of the peaks of resonant vibration (anti-nodes) that would otherwise tend to occur along the blade's span in vibration modes 1, 2 and 3. The strategic placement of such abrupt discontinuities in blade stiffness also raises the resonant frequency of vibration of said blade, which keeps it from resonating and thereby reduces or eliminates the noise that attends resonance.

Standing Waves, Resonance and Vibration Modes

A review of standing waves, resonance and vibration modes, plus their properties and the physics involved are helpful in understanding how and why the Fibonacci strategy propeller design innovation works. When a bending force whose direction is parallel to the propeller's thrust axis is applied to a propeller blade, it causes it to bend or deflect by an amount that depends upon the size of the force and the stiffness of the blade. This force could be produced by a momentary gust of air striking the blade during its operation in flight. After the force of the air gust subsides, the energy from the force that was stored in the deflected blade will bend the blade back in the opposite direction. The amount of this opposite bending can overshoot the original neutral position of the blade prior to the gust, in which case there will still be stored bending energy remaining in the blade when it reaches its rebound point of maximum opposite bending. This stored energy will cause the blade to again bend back in the original direction of deflection. This cycle of back and forth oscillating bending is a vibration that produces sound or noise by displacing air. Under certain circumstances, such as when the exciting force (the air gust) repeats at regular intervals with a just-right frequency, this vibration can persist and even increase in amplitude. This phenomenon is called resonance, i.e., where an external force drives a vibrating system to oscillate at a specific frequency known as the resonant frequency.

Resonance is what happens when one plucks a guitar string. The resulting repetition of a to-and-fro vibration of the guitar string creates what is called a standing wave and such movement of the string creates a sound of a particular tone whose frequency in cycles per second is expressed in Hz (which stands for Hertz, named for Heinrich Rudolf Hertz). The amplitude of this wave and its sound progressively dissipate with time unless the string is plucked again. A standing wave vibration along a guitar string has stationary points called nodes, where there is no motion of the string, and the wavelength of the vibration is twice the distance between adjacent nodes. Halfway between the nodes is the 'anti-node' where the amplitude of the standing wave's vibratory motion reaches its maximum. For the guitar string vibrating in mode 1, the nodes of its fundamental tone are located at each end of the string—the guitar's nut and the bridge, respectively, while the anti-node is located at the string's mid-span, i.e., 50% of the length of the string. For the propeller blade, the node of its fundamental or first critical mode of resonant vibration (mode 1) can be expected to occur at or very near the blade's neck where it emerges from the rigid hub. This node is the point at which the blade material is subject to the largest bending load, and the size, stiffness and shape of the blade determine the exact location of the node. This node is the point where the blade needs to be made strong and stiff enough to prevent excessive bending, structural fatigue or cracking. See FIG. 1 for exemplary waves and nodes.

A guitar string that is under more tension or a propeller blade under greater centrifugal tension due to greater RPM, will vibrate more rapidly, creating sound pressure waves that are closer together, and hence have a higher frequency. Such higher frequency waves tend to be of lower amplitude and impart less bending to the string or blade. Longer guitar strings or longer propeller blades tend to vibrate at lower frequencies, creating sound pressure waves that are farther apart, of greater wavelength. Thus, a slow-turning, large diameter, low RPM propeller with long slender blades, as required for ultra-quiet propellers, will tend to resonate at lower frequencies. The amplitude of these lower-frequency, long-wavelength waves are greater than those of shorter wavelength, and as such can impart greater repetitive bending loads at the nodes on the propeller blade. The large amplitude repetitive movements at the anti-nodes due to such waves make noise and the bending loads that they impart at the nodes can cause propeller blade damage if the node at which they are applied happens to be one that is located at a weak or vulnerable point along the blade's length.

The loudness of a sound corresponds to the amplitude of its sound pressure wave; the higher the peak of the wave at the anti-node, the louder the sound seems to observers. A guitar string will make a louder sound if more energy is put into it by plucking it harder. A propeller blade will make a louder sound if more energy is put into it to make thrust. The maximum thrust typically produced by an aircraft propeller blade is at brake release during full power take-off, which coincides with when it is closest to people on the ground. As the aircraft accelerates in its take-off roll, the thrust steadily decreases to substantially less extreme levels as lift-off speed is reached.

A guitar string typically vibrates at a wavelength that is twice the length of the string itself. For a cantilevered beam like a propeller blade that is clamped only at its inboard neck, the longest wavelength at which it can vibrate is one whose wavelength is 4 times the length from the propeller blade's tip to the node located at or near the blade's neck. This longest wavelength corresponds to the first critical mode of resonant vibration, which is known as vibration mode 1. The node of vibration mode 1 will typically be at or near the blade's neck and the anti-node will be at the blade's tip. The wave span, not the radius, of the blade is herein defined as the distance between the blade's tip and the predicted or measured location of the node of vibration mode 1 that occurs at or near the blade's neck. This definition is based on the typical propeller blade structure wherein the rigid hub has extreme stiffness and therefore provides extreme resistance to bending at all points inboard of the hub's outer edge. The blade's neck is located at that outer edge just outside the rigid hub and is typically the innermost location of maximal bending load. In the case of controllable pitch propeller hubs, the blade neck is typically round in cross-section and the diameter of the neck is constrained by weight and space limitations at the hub. The portions of the propeller blade just outboard, i.e., distal, of the blade's round neck are generally of larger cross-sectional area and larger chord and have large twist angles relative to the thrust axis. These features combined with the shorter moment arm that pertains for these more outboard portions of the blade mean that these blade areas generally resist bending more than does the round blade neck.

Mode 2 of resonant vibration of a propeller blade has, appropriate to the name, two nodes. For the type of blades necessary to achieve ultra-low noise, which will be those with a high aspect ratio, straight, non-swept blade with minimum taper, these two nodes are likely to be located at or near the 25% and 75% wave span locations along the blade, if the blade has no twist. Similarly, mode 3 of resonant vibration on such a non-twisted blade would have its three nodes likely located at or near the 16.67%, 50% and 83.33% wave span locations of the blade. Because vibration modes 1, 2 and 3 are the modes with the largest blade deflections and because their nodes are the points of maximum bending stress, the high aspect ratio, straight, non-swept, non-twisted blade of minimum taper mentioned above should not have abrupt local reductions in chord, stiffness and/or thickness at any of the node locations of 16.67%, 25%, 50%, 75% or 83.33% along the blade's wave span. The locations where strategically placed, stepped increases in stiffness could actually help dampen resonant vibration would occur at blade locations in between these node locations, where the increased stiffness would dampen the vibration amplitudes at the nearest anti-node. By dampening vibration at the anti-nodes, such strategically placed increases in stiffness could, from a vibration standpoint, effectively divide the long propeller blade into several shorter propeller blades, each with its own higher resonant frequency. These higher resonant frequencies will be higher than the frequencies of any excitatory forces that the ultra-quiet propeller will encounter in its normal operation at low RPMs when driven by a smooth-running electric motor. If the blade does not encounter any resonant frequencies, it will vibrate much less, make less noise and avoid the adverse conditions of repetitive high bending loads that occur during resonant vibration.

Modern finite element analysis (FEA) or finite element modeling applications, e.g., FEMAP by Siemens, software can compute and accurately predict the locations of the nodes for vibration modes 1, 2 and 3 on a blade of known shape. If the blade were straight (of zero sweep), of high aspect ratio and of uniform minimal taper, with no twist, its shape would tend to create nodes at or near the following expected locations described above and shown in FIG. 1: 16.67%, 25%, 50%, 75% or 83.33% of the blade wave span from tip to neck. In that case, the blade design could make deliberate local stiffness changes at intervals that fall in between those node locations, so as to dampen vibration at the anti-nodes.

Fibonacci Numbers: The Series, Sum, Division and Intervals

The Fibonacci numbers are the series: 1, 1, 2, 3, 5, 8, and 13, etc. wherein each larger number is the sum of the two prior numbers in the series. If a Fibonacci number, other than 1, 1, or 2 from this "Fibonacci series", is divided by its immediate predecessor in the sequence, the quotient converges toward the so-called "golden ratio" of 1.618. The golden ratio obtains for values a and b if (a+b)/a=a/b where a>b>0. The more exact value of the golden ratio is (1+√5)/2 or 1.6180339887. The successive intervals between the Fibonacci numbers, are always increasing, and are therefore always different in size. The consistent irregularity of these intervals provides a dimensional pattern that evolved in nature in the structure of many life forms, such as in the branching patterns of tree limbs, because it provides an ideal ratio for scaling strength to loads. The consistent irregularity of these intervals causes a disparity: it causes them to be inherently out of phase with the typically regular intervals between the nodes of vibration of sinusoidal sound waves in a beam structure such as a tree limb or propeller blade. This invention exploits this disparity as a means to dampen resonance in a propeller blade.

If the golden ratio of 1.618 is multiplied times each number in the Fibonacci series of 3, 5, 8, and 13, the resulting sequence of numbers, defined herein as the refined Fibonacci series, becomes the numbers 3.236, 4.854, 8.09 and 12.944. These numbers can be used to determine the locations for placing stepped local increases in stiffness at consecutive, span-wise locations on the propeller blade so that these locations consistently fall in-between the locations of the nodes for resonant vibration modes 1, 2 and 3 listed above. The sum of the 4 numbers in the refined Fibonacci series is 29.124. This Fibonacci sum, the number 29.124, is a constant that can be used for any Fibonacci quotient. The "Fibonacci quotient" is defined as the process by which the Fibonacci sum of 29.124 is divided into the measured or calculated length of the wave span of the propeller blade. The wave span of the propeller blade is generally the distance between its tip and its neck, or better, if known by calculation, the distance from the blade tip to the exact location of the node of vibration mode 1. A software tool, such as FEMAP, performing finite element modeling on the actual shape of the propeller blade can show by calculation the location of that node for vibration mode 1. If that node is more outboard, i.e. further out on the blade than the neck, then the wave span used to obtain the Fibonacci quotient is the distance from the propeller tip to the calculated location of that single node in vibration mode 1. The Fibonacci quotient will be the key factor for use in determining the Fibonacci intervals, as in the following example:

An exemplary propeller system has a 10 foot diameter, with non-twisted blades whose wave spans from tip to neck are 53.468 inches (135.8 cm). The result of the division of 53.468 by the Fibonacci sum of 29.124 is 1.835874, which is the Fibonacci quotient. This Fibonacci quotient, the number 1.835874, is the key number. It is then multiplied times each of the numbers in the refined Fibonacci series, i.e., 3.236, 4.854, 8.09 and 12.944, to yield the series of consecutive blade distance intervals in inches or millimeters, starting at the tip, where local increases in blade stiffness can be strategically placed to dampen vibration. The resulting distance intervals are called "Fibonacci intervals": and in the example case here these intervals are then: 5.94 (15.1 cm), 8.91 (22.6 cm), 14.85 (37.7 cm) and 23.76 inches (60.35 cm), measured consecutively from the tip of the propeller blade. These intervals are depicted along with the nodes of vibration modes 1, 2 and 3 in the untwisted propeller blade shown in FIG. 1. Note that the key number of 1.835874 in this example depends upon the wave span and will be different for different propellers as well as for this 10 foot diameter propeller once appropriate twist is added to the blade, because twist would change its wave span.

These calculated consecutive Fibonacci intervals are implemented by placing the first stepped blade stiffness change 5.94 inches (15.1 cm) from the tip of the blade, at what is called the first Fibonacci terminus of the first Fibonacci interval. The second or next change in blade stiffness is placed at the $2^{nd}$ Fibonacci terminus, which according to the second Fibonacci interval, is located 8.91 (22.6 cm) inches inboard from the first Fibonacci terminus. The third of these three increases in blade stiffness is then placed at the third Fibonacci terminus, which according to the second Fibonacci interval, is located 14.85 inches (37.7 cm) inboard from the second Fibonacci terminus and the fourth blade stiffness change is placed at the $4^{th}$ Fibonacci terminus, which according to the $4^{th}$ Fibonacci interval, is located 23.76 inches (60.35 cm) inboard of the second Fibonacci terminus. It can be noted in FIG. 1 that these 4 Fibonacci interval locations and their Fibonacci terminae fall in-between the specified node locations of modes 1, 2 and 3, as shown.

By employing the Fibonacci numbers and golden ratio to determine the blade stiffness change locations for this ultra-quiet propeller design, along with its greater than usual blade thicknesses, the resonant frequencies of such an ultra-quiet propeller are anticipated to be higher than any that will be encountered during its normal operation. This property will confer on this ultra-quiet propeller a safety margin against destructive resonant vibration of its blades and help avoid large amplitude vibrations that would increase propeller noise.

Depending upon the particular ultra-quiet propeller design and its application, the Fibonacci series can be employed as described above to dampen vibrations by providing the 4 Fibonacci terminae locations along the blade for the stepped blade stiffness changes. The 4-location blade used as an example herein uses the Fibonacci numbers 3, 5, 8 and 13.

Because the placement of the stepped blade stiffness changes at the Fibonacci terminae will themselves alter the resonance properties of the propeller blade, the precise locations for stepped blade stiffness changes must, in practice, be determined by an iterative process. Propeller blades necessarily have twist in order that each portion of the blade cuts the air at the ideal blade angle for its airspeed and RPM. The twist in a propeller blade strongly affects its resistance to forward and rearward bending compared to a flat, untwisted blade. The blade locations of the nodes for vibration modes 1, 2 and 3 for an untwisted propeller will likewise change when that propeller blade stiffness is changed to include ideal twist. Consequently, twist also changes the wave span and the Fibonacci intervals derived therefrom, which determine the precise locations for the stepped blade stiffness changes at locations that are in-between those of the vibration nodes. These in-between locations, at the Fibonacci terminae, are then finalized after software analysis determines the exact node locations for vibration modes 1, 2 and 3 on the final version of the twisted blade. Implementing the first or second pass of iterations of stepped blade stiffness changes to fit in-between the new software-determined node locations will further alter the blade's resonance characteristics and so require yet another round of recalculation of the locations of its nodes for vibration modes 1, 2 and 3. The newly found node locations will then require yet another re-computation of the Fibonacci intervals to obtain the precise locations for the in-between stepped blade stiffness changes. These interactive computations (iterations) are repeated until the changes become asymptotic and final stiffnesses are resolved so that the final blade design can be frozen. This iterative process is necessary to ideally apply the Fibonacci strategy of determining the preferred in-between locations for stepped blade stiffness changes. Analytical software for rapidly calculating the vibration node locations exists, such as Siemens' finite element modeling software named FEMAP, and it can accurately predict the vibration node locations for the twisted, tapered propeller and the changes thereto caused by successive iterations of its shape and stiffness that include the Fibonacci-based changes.

Prior studies of the basic physical properties and behaviors of tapered and twisted beams, though not using a Fibonacci strategy, do support the concept of using stiffness intervals to control vibration. In 1987, Townsend at NASA demonstrated the principle of using stiffness intervals to deliberately disrupt and dampen vibration nodes[9]. Other studies confirm use of this principle[10]. The vibration behavior of tapered beams is well documented[11]. However, none of these studies used the Fibonacci strategy or Fibonacci series to create the stiffness intervals.

The changes in vibration node locations that result from tapering an otherwise non-tapered cantilevered beam, and particularly for those of high aspect ratio, have been studied and are found to be relatively small[2]. Studies of the effect of twist on vibration node location showed that the nodes tend to move toward the blade tip as twist is increased[13]. The net effect of twist is therefore that all nodes move somewhat closer together, making a shorter wave span. This, in turn, will cause the re-computed Fibonacci terminae to likewise become closer together based upon a Fibonacci quotient that uses the shorter wave span.

Helicopter blade studies have shown that composite blades have the unique and favorable property of coupling the bending and torsional loads, which can provide better vibration damping[14]. The fiber orientation angles that are used in composite structures have a significant and controllable effect upon beam stiffness and resonance[15]. These additional structural material and fiber orientation influences upon blade stiffness and resonance can impart to the blade a differential tensile and compressive modulus that can be incorporated into the Fibonacci strategy using software tools that predict the locations of the nodes and the resulting Fibonacci intervals.

Synergistic Noise Reducing Strategies (SNRS)

The third design feature of this invention is the use of the following synergistic noise reducing strategies in combination with the VRTDS and the Fibonacci Strategy:

a) propeller blade tip speeds below 500 feet per second FIG. 3; and b) large diameter, propellers with between 4 and 10 blades of high aspect ratio FIG. 3; and c) customized airfoil sections with high lift coefficients at low Reynolds numbers FIGS. 3, 7, 8 and 12; and d) laminar flow airfoils that reduce the noise from turbulent and separated flow; and e) span-wise airfoil and blade sweep changes that reduce local span-wise pressure gradients FIG. 4; and f) blade airfoils with high lift capabilities and docile stall characteristics FIG. 5; and g) blades with shortened necks whose innermost non-airfoil portions are fully enclosed by an axisymmetric streamlined spinner with a spinner shape that is cylindrical across its aft region from which the innermost blade airfoil emerges FIGS. 6 and 11; and h) relatively thick airfoils for blade stiffness and vibration resistance FIG. 7 (blade), 8 and 12 (airfoils); and i) spread-tow and conventional carbon fiber and carbon nano-fiber (CNF) composite blades for extra stiffness and light weight; and j) aramid fibers as a blade's core material, applied in a span-wise spiral braid that dampens vibration; and k) between 4 and 10 blades (inclusive) in a fast-acting, controllable-pitch multi-blade propeller hub; and l) abruptly tapered fillet shape change from blade airfoil at the spinner surface to a round blade neck at the outer edge of the hub FIG. 9.

The following will address each of these in more detail:

a) propeller blade tip speeds below 500 feet per second: Theory and experiment show this to be a fundamental requirement in achieving the lowest possible propeller noise. These low tip speeds must be balanced against the need to produce thrust and the propeller diameter limits necessary to avoid ground strike by the propeller's tip. FIG. 3 shows the design constraints that apply to low tip speed propellers and a preferred embodiment.

b) large diameter propellers with between 4 and 10 blades of high aspect ratio: Noise prediction formulae consistently show that larger numbers of slender blades substantially reduce rotational noise levels.

) c) customized airfoil sections with high lift coefficients at low Reynolds numbers: Takeoff requirements for large amounts of thrust demand the use of high lift coefficients in a setting of low Reynolds numbers and low RPM, and it is possible to optimize airfoil shapes for this purpose.

d) laminar flow airfoils that reduce the noise from turbulent and separated flow: Laminar flow is difficult to achieve at low Reynolds numbers, but is the lowest noise flow pattern for an airfoil.

e) span-wise changes in airfoil and blade sweep angle that reduce local span-wise pressure gradients: CFD software tools can guide this strategy. The optimization by CFD must account for the complex pressure changes due to the airfoil shape, its angle of attack and the progressive increase in air flow velocity at the more outboard locations along a rotating propeller blade.

f) blade airfoils with high lift and docile stall characteristics: see e) above.

g) blades with shortened necks whose innermost non-airfoil portions are fully enclosed by an axisymmetric streamlined spinner with a spinner shape that is cylindrical across its aft region from which the innermost blade airfoil emerges. As mentioned, in order to optimize for thrust and low noise, the propeller blade should have a functional airfoil shape as it emerges radially from the outer surface of the spinner.

h) relatively thick airfoils for blade stiffness and vibration resistance: Finite element analysis (FEA) software tools such as FEMAP are needed to optimize blade thicknesses for these purposes, while incorporating the blade stiffness changes that are located at the appropriate Fibonacci terminae.

i) carbon fiber blades wherein carbon fiber, as used herein, includes spread-tow and conventional carbon fiber as well as carbon nano-fiber (CNF) composites: This strategy enables propeller blades with maximum stiffness, lighter weight, less thickness noise and less bending, for a given cross-sectional blade size.

j) aramid fibers as a blade's core material, applied in a span-wise spiral braid that dampens vibration: The self-damping properties of aramid fiber due to its differential in tensile versus compressive strength, can be further enhanced if it is applied inside the blade in a spiral braid. Such use of aramid fiber makes the propeller blade anisotropic, which means that it has a physical property such as its modulus that has a different value when measured in different directions.

k) Between 4 and 10 blades, inclusive, and including any whole number within that range including 5, 6, 7, 8, and 9, in a fast-acting, controllable-pitch multi-blade propeller hub: A stout hub reduces vibrational noise. Increasing the number of propeller blades is a proven strategy for reducing noise, and it should be combined as described herein with stiff blades of high aspect ratio and near-zero sweep. See FIG. 6.

l) abruptly tapered fillet shape change from blade airfoil at the spinner surface to a round blade neck at the outer edge of the hub: The round blade root enables rotation of the blade to effect blade pitch changes by the controllable hub. The innermost airfoil at the spinner skin should be one that is still effective at making some thrust with low drag. The shape transition from the blade's round neck to its innermost airfoil must be accomplished in as short a span-wise distance as possible in order to minimize the frontal area of the spinner.

See FIG. 9.

Blade Optimization Process

To optimize the propeller's ratio of thrust to noise involves the application to a known aircraft of all three design strategies described in this invention, which are the Vortex Reducing Thrust Distribution Strategy (VRTDS), the Fibonacci Strategy and the Synergistic Noise Reducing Strategies (SNRS). The known aircraft is one whose installed power, weight, take-off speed, desired rate of climb, number of propellers, maximum permissible take-off RPM, permissible propeller diameter, and number of propeller blades are all known in advance. These known attributes should be selected at the outset so as to favor very low take-off noise. This generally means having a lightweight aircraft of low span loading that can take-off with a small amount of power at a relatively low airspeed, can climb steeply before exiting the airpark property, and can do so with large, multi-bladed propeller(s) whose low propeller or rotor RPM keeps the propeller/rotor tip speeds below 500 feet per second (FPS) while generating sufficient thrust for the take-off and climb performance needed.

The steps in this design process are as follows:

First step; if the amount of thrust required for take-off and climb is known, then it can be divided equally between the propeller blades that will be supplying that thrust. This simple division will determine the total take-off thrust per blade. The total thrust per blade is then distributed along the blade in accordance with the preferred ultra-quiet profile of the VRTDS, which biases thrust toward the root and provides negative thrust at the tip, as shown in FIG. 2. By tailoring the lift coefficient, angle of attack, blade sweep and blade chord for each location along the blade, the ideal thrust distribution can be obtained. This tailoring is an iterative process that also subtly alters the blade's stiffness and vibration node locations as the chords and angles of attack (and therefore the twist) at each location along the blade are tailored for the appropriate level of thrust. The changes in vibration node locations, in turn, change the blade's wave span and necessitate a revision of the Fibonacci intervals, which then calls for a re-computation of the blade stiffness and node locations and more commensurate revisions to the Fibonacci intervals, as described in the second step, below. These iterations continue until the results become asymptotic to the desired requirements, at which point the design can be finalized.

Second step: one calculates using the Fibonacci intervals for the step-wise locations along the untwisted propeller blade where stepped-changes in the blade stiffness will dampen resonant vibration of modes 1, 2 and 3. Next, the designer selects the series of optimum airfoils of diminishing thickness ratios to be located at each station from the hub to the tip consecutively with the stepped-changes in blade stiffness occurring at the terminae of the Fibonacci intervals. These airfoils are also selected so as to have high maximum lift coefficients, docile stall characteristics, laminar flow where possible and good performance at low Reynolds numbers. When the design process is complete, and the blade shape is predicted to be sufficiently strong for the loads to which it will be subjected in use, it can then be built and tested at and above rated RPM to determine its thrust, noise, efficiency and vibration characteristics.

The determination of the optimum blade angles along the blade's span deserves special explanation: Blade angles are different at each radius along the blade. These blade angles are initially based upon the blade pitch. Blade pitch is simply the forward distance, typically in feet, traveled by the propeller during one revolution. Blade pitch is determined by the helical path of the propeller based upon its RPM and forward aircraft velocity. Pitch equals V/(RPM/60) with V, the velocity, in feet per second. Once known, pitch can itself be used in a trigonometric formula to find the initial blade angle at each radius r along the blade span, as follows: blade angle=$\beta$=arctan(pitch/(2*pi*r)), where r and pitch are both expressed in feet. However, final blade angles (FBA), which are usually labeled as the "beta angle" or $\beta$, must, at each radius along the blade, take into account more than simply the blade pitch. The FBA must also include the desired local angle of attack (LAOA), which progressively decreases at successively more outboard blade stations and is also referred to as alpha or $\alpha$, as well as including the actual local inflow angle (ALIA), which is usually labeled as phi or $\phi$. For maximum accuracy, $\phi$ must itself include the correction angles, which are the local induced up-wash angle (LIUA) and the local slow-down angle (LSDA). Thus we can say that FBA=$\beta$=arctan((pitch/(2*pi*r)+LAOA+ALIA. Similarly, we can say that the FBA or $\beta$=arctan(pitch/(2*pi*r)+$\alpha$+$\phi$. It follows that the ALIA=$\phi$=LIUA+LSDA. See FIG. 10. The FBAs used in the embodiment presented herein include these correction angles, which are unique to this propeller's intended take-off thrust, airspeed, RPM, diameter and airfoils, and these are shown in FIG. 8. It must be noted that this preferred embodiment propeller, by use of its hub, can rotate each of the blades to set them at identical blade angles to fit the changing thrust, airspeed and RPM in different modes of flight and the $\beta$, $\alpha$ and $\phi$ angles to suit those conditions. These different modes of flight include climb, cruise and descent. Alternative ultra-quiet propeller designs, while using the several innovations of this invention, but applied to other, different aircraft with different levels of thrust, airspeed, RPM and airfoils will have to use different values for R, a and at each radius along their blades. In addition, this preferred embodiment's FBAs at locations along the outermost 7% of blade span near the blade tip incorporate p angles that are deliberately reduced so as to create negative thrust there in order to produce the desired noise-cancelling vortex at those locations.

This summary of the blade optimization process for this invention is provided to show the sequence of general and specific methodologies that are used. It should be noted that the VRTDS is an unconventional propeller blade thrust distribution, including negative thrust at the blade tip, as well as the use of the Fibonacci series in the Fibonacci strategy to compute the locations of stepped changes in blade stiffness, are both general principles and yet each has specific limits defined herein. That is, they are general methodologies that are herein specified as to the range of their amounts and geometries. The methodologies of blade design described as innovations in this patent are principles that can be generically applied to a range of different ultra-quiet propeller sizes, disc loadings and thrust levels to fit various aircraft that operate at different airspeeds.

The preferred embodiment presented herein serves as a guiding introduction to some of the possible embodiments of the invention, and is not intended to be limiting. Additional example embodiments of this invention including its mirror-image, variations, alternative configurations and their bounding ranges are provided herein.

BRIEF DESCRIPTION OF SEVERAL VIEWS OF THE DRAWINGS

The accompanying drawings are included to provide a further understanding of the invention and are incorporated in and constitute a part of this specification. They illustrate embodiments of the invention, and together with the description serve to explain the principles of the invention.

Corresponding reference characters indicate corresponding parts throughout the several figures presented. The figures represent an illustration of some of the embodiments of the present invention and are not to be construed as limiting the scope of the invention in any manner. In FIG. 11, dimensions are not to scale and some features are exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms comprises, comprising, includes, including, has, having or any other variation thereof, are intended to cover a non-exclusive inclusion. For example, a process, method, strategy, article, or apparatus that comprises a list of elements is not necessarily limited to only those elements but may include other elements not expressly listed or inherent to such process, method, strategy, article, or apparatus. Also, use of a or an are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
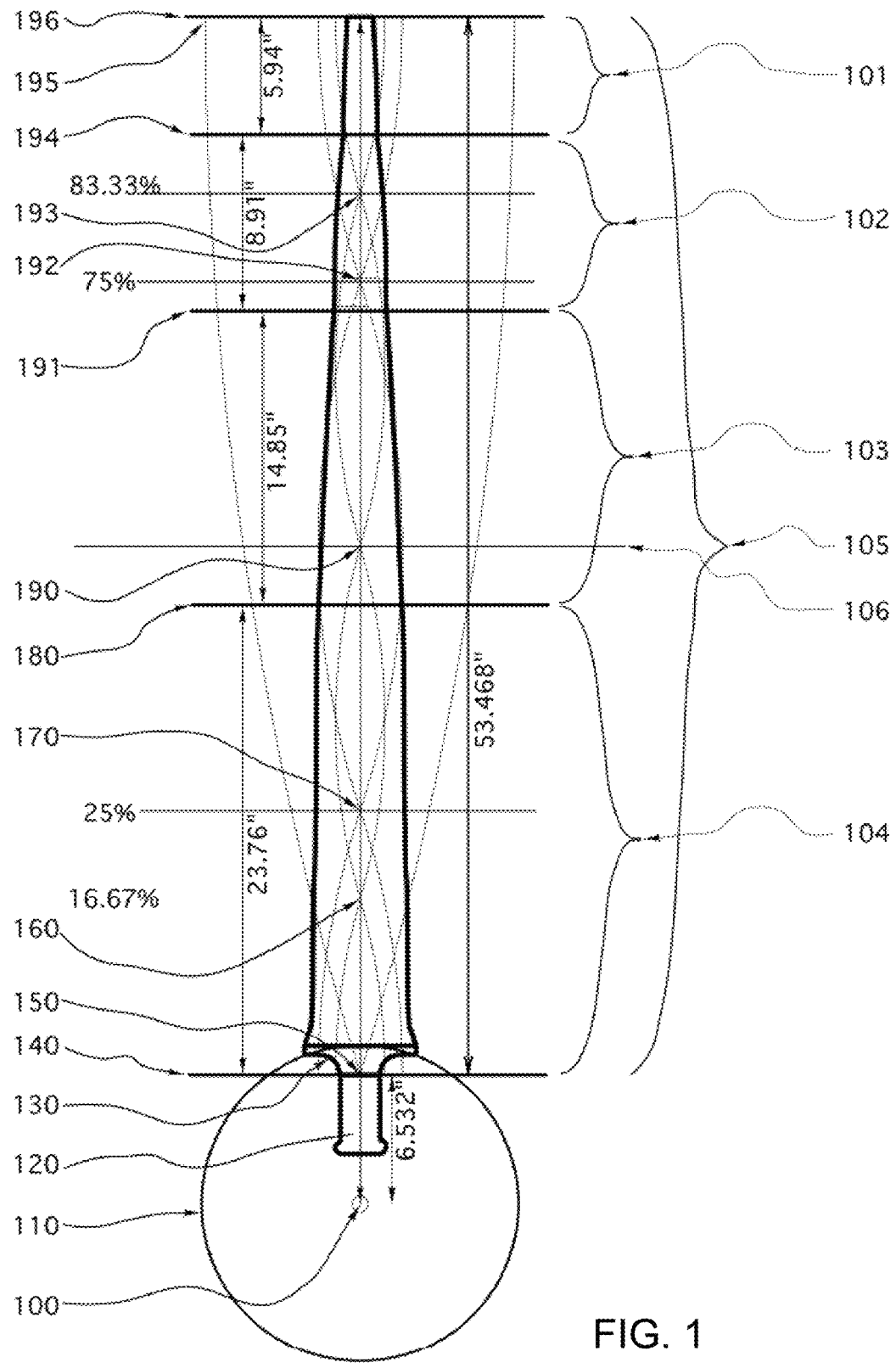
FIG. 1 shows the wave span, Fibonacci intervals and the nodes of vibration modes 1, 2 and 3 on an untwisted planform of an exemplary propeller blade.

In FIG. 1, an exemplary high aspect ratio propeller blade is shown in plan-form view without twist, along with the curved line wave patterns of vibration modes 1, 2 and 3. The distance from its neck to its tip is the dimension on which the wavelengths of vibration modes 1, 2 and 3 are calculated. The heavy horizontal line at 196 at the tip is located 53.468 inches from the propeller blade neck, which neck is transected by the heavy line at 140. The axial center of the blade neck is at 150. The location of the large amplitude anti-node of vibration mode 1 is shown at 195. The relative amplitudes of the vibratory waves depicted in FIG. 1 are proportional by their distance from the blade centerline. The distance from the anti-node of vibration mode 1 at the blade tip to the inboard node of vibration mode 1 near the blade neck at 150 is hereby defined as the wave span of this propeller blade. The wave span is a key metric used in the calculation of the Fibonacci intervals. The wave span in FIG. 1. is for a non-twisted propeller and is indicated by the large bracket labeled 105. The half-way point at 50% along the wave span is shown by the horizontal line at 106. The wave span depends upon the amount of propeller blade twist and it can be re-calculated for any blade twist that is required to achieve the design thrust distribution. At location 196, it can also be seen that the amplitude of the vibratory wave at the various anti-nodes is greatest in mode 1, somewhat less in mode 2 and markedly less in mode 3. The heavy horizontal line at 194 marks the blade station that is the inboard terminus of the first Fibonacci interval of 5.94 inches, measured from the tip. This blade station is defined as the first Fibonacci terminus. The second, third and fourth Fibonacci terminae are likewise at the blade stations that are the inboard terminae of their respective Fibonacci intervals. The Fibonacci terminae are the blade stations where the propeller blade's local stiffness can be strategically increased in order to dampen vibration. Location 193, at 83.33% of wave span, marks the location of the outermost of the three nodes of vibration mode 3. It must be remembered that a node is the point at which a given wavelength of vibration produces the most bending of the blade. Therefore, nodes are not good locations for abrupt changes in blade thickness. Location 192, at 75% of wave span, marks the location of the outermost of the two nodes of vibration mode 2, whose other node for this wave span is located at 25% of wave span, at location 170. The heavy horizontal line 191 marks the blade station that is the inboard terminus of the second Fibonacci interval of 8.91 inches, measured from the first Fibonacci terminus at location 194. Location 190 marks, at 50% of wave span, the middle node of the three nodes of vibration mode 3. The heavy horizontal line at location 180 marks the blade station that is the inboard terminus of the third Fibonacci interval of 14.85 inches, measured from the second Fibonacci terminus at location 191. At 25% of wave span, 170 marks the location of the innermost of the two nodes of vibration mode 2. At 16.67% of wave span, 160 marks the location of the innermost of the three nodes of vibration mode 3. The centerline axis of the propeller blade, at location 150, is a span-wise location that coincides with the node location of vibration mode 1 at the blade neck. The heavy horizontal line at location 140 represents the propeller blade neck as well as marking the blade station that is the inboard terminus of the fourth Fibonacci interval of 23.76 inches, measured from the third Fibonacci terminus at location 180. The transition in shape from the cylindrical blade neck at 140 to the innermost blade airfoil is a fillet zone 130, which is detailed in FIG. 9. The cylindrical blade root is at location 120. The outermost circumference of the circular streamlined propeller spinner is location 110 and the center of the propeller thrust axis is at location 100. The Fibonacci intervals are indicated by brackets on the right side of FIG. 1. The top bracket centered at 101 indicates the span of the $1^{st}$ Fibonacci interval. The bracket at centered at 102 indicates the span of the $2^{nd}$ Fibonacci interval. The bracket centered at 103 indicates the $3^{rd}$ Fibonacci interval. The bracket centered at 104 indicates the $4^{th}$ Fibonacci interval.

Figure 2:
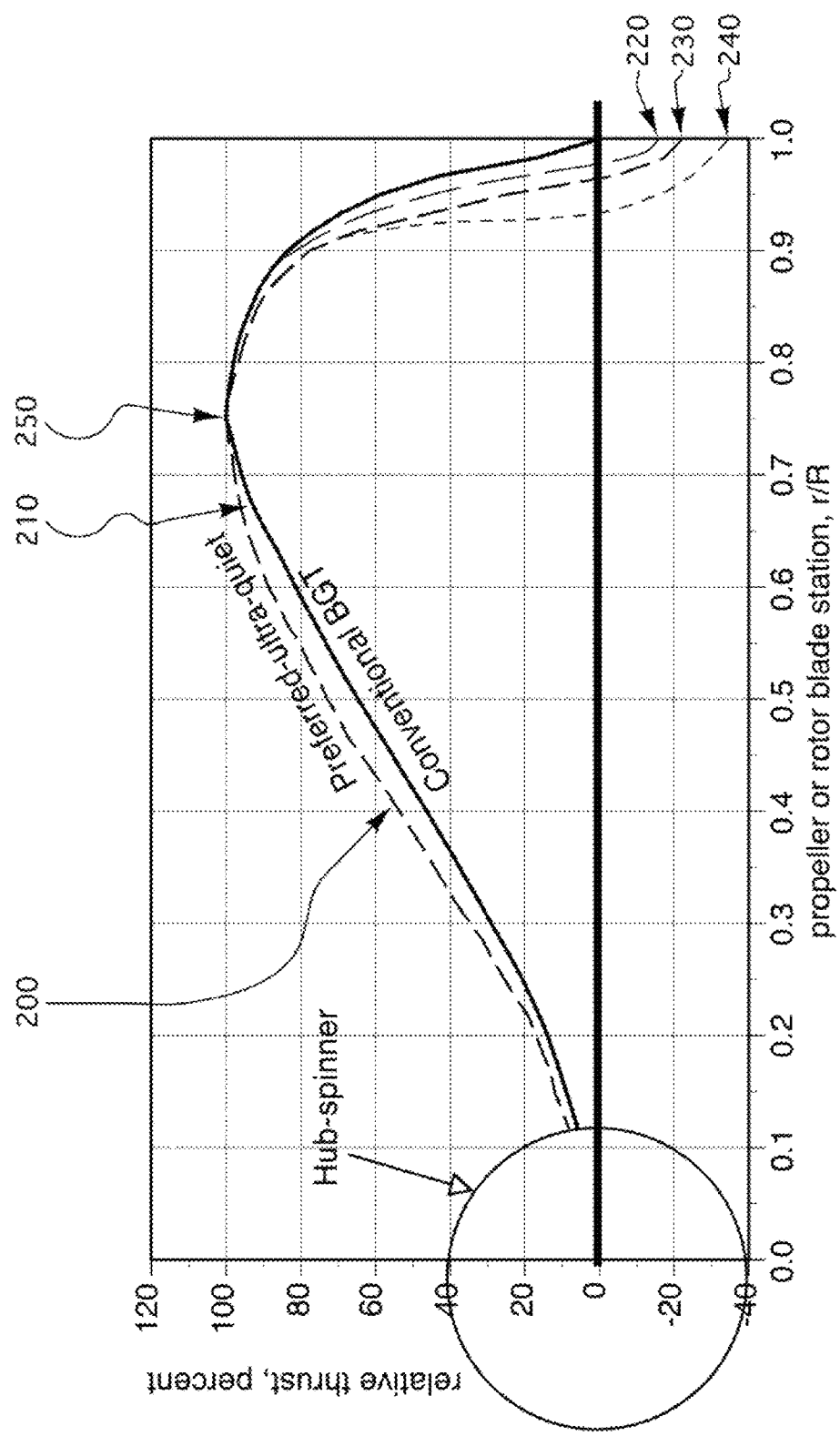
FIG. 2 shows a graph of the invention's changes to relative thrust distribution—the VRTDS.

FIG. 2 shows a graph of relative thrust versus the propeller blade station, or position along the propeller blade with 1.0 being the tip. The solid line 210 represents the conventional minimum induced loss Betz-Goldstein-Theodorsen (BGT) relative thrust distribution, in which the thrust drops to zero at the tip and thrust is low for the inner third of the blade. An exemplary propeller has a changed thrust distribution along the span of the propeller blade. The dashed line labeled 200 depicts a changed relative thrust distribution for an exemplary ultra-quiet propeller blade of the present invention that has increased thrust along the inner portion of the blade and negative thrust at the tip, in accordance with the VRTDS. The dashed lines 220 and 240 show the range of possible variations of the negative relative thrust distribution at the tip of exemplary ultra-quiet propeller blades. Reference number 220 points to a negative relative thrust of −15% at the blade tip. Reference number 240 points to a negative relative thrust of −35% at the blade tip. These variations do not encompass all possible such variations, but indicate that the negative thrust at the tip can be tailored according to the blade loading and other requirements and still represent the ultra-quiet propeller strategy of this invention. The point, reference number 230, on the graph shows the negative or −22% relative thrust value at the tip of an exemplary embodiment of a propeller blade of the present invention. Reference number 250 shows the point on the graph representing a maximum of 100% relative thrust of the conventional minimum induced loss BGT propeller model and this maximum can be seen to occur at the 0.75R blade station. Note that the relative thrust at reference number 240 is −135% of the maximum of 100% relative thrust shown by reference number 250. Also note that the dashed line leading to reference number 240 is shown on the graph as transitioning from a positive to a negative value at the 0.93R blade station.

Figure 3:
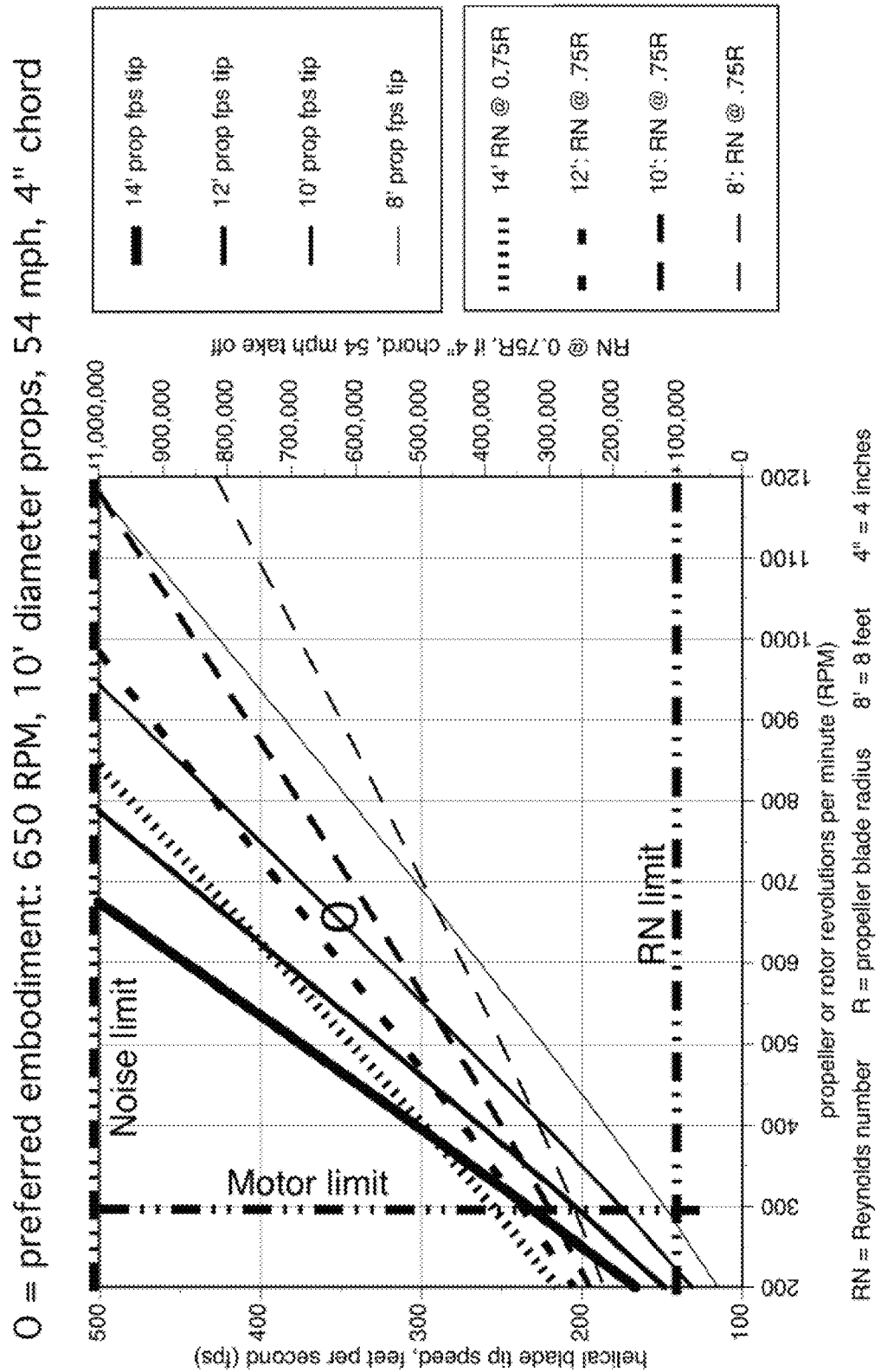
FIG. 3 shows Reynolds number versus tip speed versus RPM for a small chord propeller blade as design boundaries.

FIG. 3 shows a graph of helical blade tip speed versus propeller revolutions per minute (RPM) with four different large diameter propellers plotted thereon. Each of the propellers shown has a 4-inch average chord. Also shown on the vertical axis on the right side of the graph are the Reynolds numbers obtained at the 0.75R radius for these four propellers according to their RPM. The graph shows the practical bounding limits for motor efficiency, airfoil efficiency and noise. These limits, which are imposed by physical realities well known to those familiar with the art, constrain the design of ultra-quiet propellers to propellers having large diameters that are operated at low RPM. Specifically, direct drive motors whose noise levels are lower than those with gear reductions, need at least 300 RPM in order to achieve reasonable efficiency. Airfoils that operate at Reynolds numbers above 100,000-200,000 generally can achieve much higher lift to drag ratios. Propeller noise studies have historically found a substantial reduction in noise when blade tip speeds are kept below 500 feet per second, and especially when below 400 fps. The metrics for a preferred embodiment of an ultra-quiet propeller are shown in a somewhat central location on the graph by the symbol 0, depicting the preferred case of a 10-foot diameter propeller of 4 inch average chord operating at 650 RPM. According to the bounding limits shown in FIG. 3 and considering the fact that the blade roots must be separated by several inches in the blade hub, an exemplary propeller blade may have a blade span from a root to a tip that is at least 3.25 feet long or more, such as up to about 7 feet, up to about 6 ft, up to about 5 ft, up to about 4 ft and any range between and including the blade spans provided.

Figure 4:
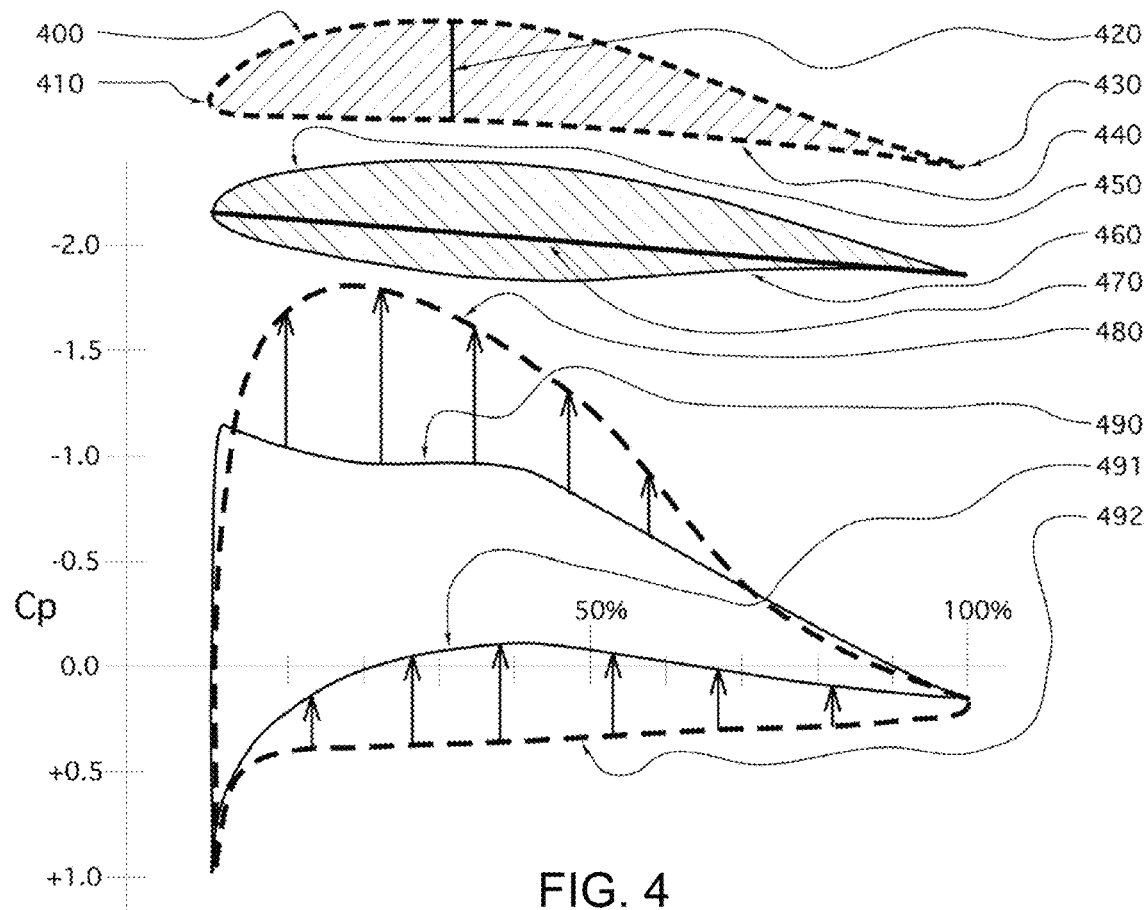
FIG. 4 shows propeller nomenclature and the concept of span-wise flow between adjacent airfoils including span-wise pressure gradients with arrows.

FIG. 4 shows two dissimilar airfoils of identical chord, each tilted at a 5° angle of attack and with their leading edges aligned to an imaginary vertical line passing through zero on the abscissa of the graph below. The graph shown in FIG. 4 is registered with the chordwise stations of these airfoils and it shows the chord-wise pressure distributions along the upper and lower surfaces of each airfoil that would occur at this 5° angle of attack. The graph's abscissa (horizontal axis) depicts the relative chord-wise positions along the airfoil. The graph's vertical axis is labeled Cp, the pressure coefficient, which is the ratio of the quantity given by the quantity of the local static pressure minus the free-stream static pressure, divided by the free-stream dynamic pressure. This ratio, the Cp, yields negative numbers when the local static pressure is below the free-stream static pressure, as is typically the case for locations along the forward upper surface of an airfoil, where the convexity causes the local air velocity to be faster than the free-stream velocity. By convention, the signs (plus or minus) of the graph's vertical axis (ordinate) numbers are inverted in a Cp graph. That is, the values of Cp that are negative numbers are shown on the upper portion of the vertical axis above the graph's abscissa while positive Cp values are shown below the abscissa. In FIG. 4, the topmost airfoil, whose upper surface is labeled 400, and which is shown outlined with a dashed line, can be referred to as airfoil 400. The dashed outline of airfoil 400 corresponds to the dashed lines showing its pressure distributions in the graph below. This dashed line airfoil 400 has a more upwardly convex curve in the forward portion of its upper surface than the other airfoil shown below it. This means it has greater "camber". Reference number 480 in FIG. 4 points to the dashed line curve in the graph showing the large negative upper surface pressure coefficient (Cp) that corresponds with the upper surface of the topmost airfoil 400. Reference number 410 shows the leading edge of the dashed line airfoil 400. Reference number 420 points to a vertical line that represents the maximum thickness of the dashed line airfoil 400. Reference number 430 points to the trailing edge of the dashed line airfoil 400. The lower surface of the dashed line airfoil 400 is labeled 440. Reference number 450 points to the upper surface of the other airfoil, whose outline is a solid line, and which can be referred to as airfoil 450. Airfoil 450 is just below airfoil 400 in FIG. 4. The solid line in the graph below correspondingly shows the negative upper surface pressure coefficient (Cp) along the upper surface of this airfoil 450 and is shown by label 490. Reference number 460 points to the lower surface of the airfoil 450. Reference number 470 points to the chord-line of the airfoil 450. The chord-line extends from the trailing edge to the leading edge of an airfoil. The length of the chord-line is called the chord of the airfoil. Reference number 491 points to the solid line curve on the graph that depicts the surface pressure coefficient (Cp) corresponding with the lower surface 460 of the airfoil 450. Reference number 492 points to the dashed line curve in the graph that depicts the surface pressure coefficient (Cp) corresponding with the lower surface 440 of the dashed line airfoil 400. The upward pointing arrows in the upper portion of the graph depict the span-wise direction of airflow from the upper surface of airfoil 450 toward the upper surface of airfoil 400 (the dashed line airfoil). The upward pointing arrows in the lower portion of the graph depict the span-wise direction of airflow from the lower surface 440 of the dashed line airfoil 400 toward the lower surface 460 of the solid line airfoil 450. These span-wise airflow directions are the result of the inherent tendency of local airflow to consistently travel toward a region of more negative pressure. In the example case in which the dashed line airfoil and the solid line airfoil are located side by side along the span of a propeller blade, the directions of the airflows shown by these two sets of arrows, i.e., toward the dashed line airfoil 400 on the upper surface and away from the dashed line airfoil 400 on the lower surface, reveal span-wise flows that are in opposite directions. These opposite span-wise airflows are undesirable because they decrease the productive chord-wise flow and it produce a noise-making vortex that emanates from the trailing edge of the propeller blade. The purpose of FIG. 4 is to illustrate the mechanism by which adverse span-wise airflow develops between adjacent dissimilar airfoils on a propeller blade and to assert the CFD-guided design to reduce such airflow as a strategy essential to the ultra-quiet propeller. CFD software tools can model the local pressure profiles of Cp versus blade chord position for the upper and lower surfaces of each of the several airfoils used at the span-wise stations along a propeller blade. It can array these profiles in a span-wise model of pressure gradients from one airfoil to the next. The 'steepness' of these neighboring pressure gradients reveals and predicts the magnitude and direction of adverse local span-wise flow. By iterating insertions of different airfoils and/or changes of the camber of these airfoils, the steepness of these gradients can be reduced to a minimum and thereby minimize adverse span-wise flow. The steepness of these gradients is directly proportional to the height of the vertical arrows shown in graph of FIG. 4. The pressure gradient changes that result from small changes in a local airfoil's angle of attack can also be iterated by CFD software tools in order to fine-tune the local pressure gradients so as to minimize span-wise flow. This fine-tuning using software tools can be prioritized for the angles of attack that pertain during the most noise-critical phases of flight, i.e., during the take-off roll and initial climb. This technique of iterating and optimizing the local span-wise flow using CFD software tools can also be used to deliberately promote span-wise flow when such is advantageous, such as when a reverse tip vortex is sought in the VRTDS.

Local span-wise flow can be advantageous for reducing noise if created near the blade's tip at a location and in a direction that opposes and dissipates the blade's conventional tip vortex. Creating such proverse span-wise flow may be accomplished by either of two strategies included in this invention. The first strategy is to select the local tip airfoils so that their pressure distributions create proverse span-wise flow. The second strategy is to twist the outermost portions of the blade toward negative angles of attack that produce negative thrust and, thereby, proverse span-wise flow. These two strategies can be combined. As a means of minimizing unwanted span-wise airflow on the blade, conventional propeller designs often use the simplified strategy of using the same or very similar airfoil shapes at all locations along their span. Such conventional designs limit the choice of airfoil and forsake the selective use of some airfoils that could help to both reduce propeller noise and, if located at appropriate Fibonacci terminae, quell harmful vibrations. This invention provides the strategy and method for using CFD and FEMAP software tools to iterate complex optimum low-noise solutions for airfoil selection and for blade shape design that allow inclusion of many different airfoils. Modern computerized numerically controlled milling machines can accurately carve rigid metal molds for making composite propeller blades with any complex shape called for by the CFD and FEMAP software tools. Advanced technology additive manufacturing may soon also be able to print such propeller blades accurately and with sufficient blade strength.

Figure 5:
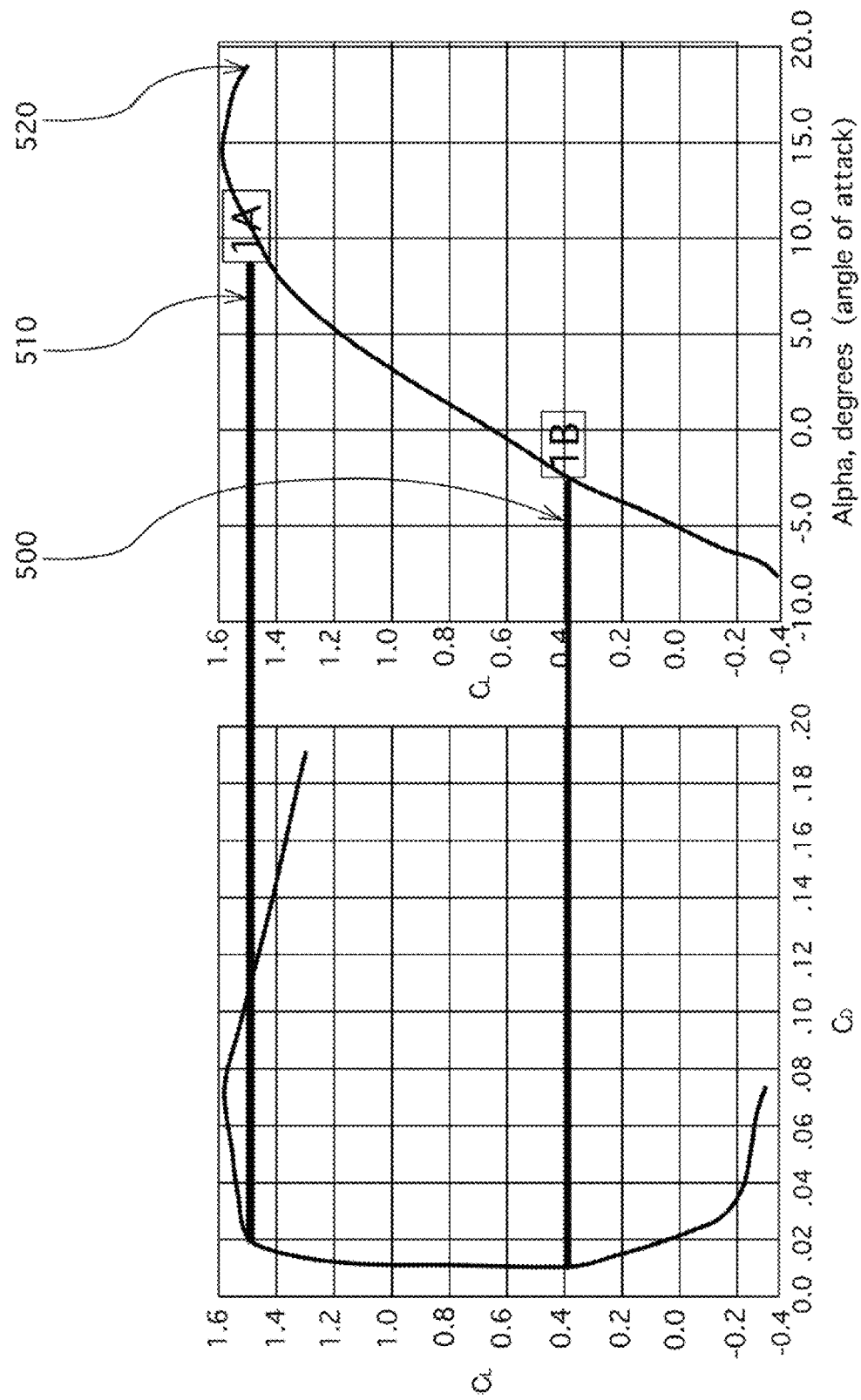
FIG. 5 shows a graph of lift coefficient versus alpha with selection zones.

FIG. 5 shows the angle of attack and its effect upon an airfoil section's lift and drag coefficients of a representative airfoil chosen for its favorable characteristics for use on an ultra-quiet propeller blade. The section lift coefficient, $C_L$, for a given airfoil depends upon the Reynolds number and the shape of the airfoil. It generally increases with angle of attack up to its maximum, which is called $C_{Lmax}$ and which occurs at the so-called stall angle of attack. At angles of attack larger than the stall angle of attack, the $C_L$ declines. If this decline in $C_L$ is gradual rather than steep, the airfoil is said to have a docile stall characteristic. The section drag coefficient, $C_D$, also varies with angle of attack and is also dependent upon both the Reynolds number and the shape of the airfoil. For an airfoil section, the $C_D$ is equal to the drag divided by the quantity of the dynamic pressure times the chord. In FIG. 5, and in the preferred embodiment of the ultra-quiet propeller herein, the foremost design goal is to set propeller blade angles all along the blade to have large angles of attack that deliver near maximum $C_L$ at the take-off airspeed and RPM, while keeping the $C_D$ as low as possible. These near maximum $C_L$ values provide large amounts of lift and thrust. In this embodiment, the take-off airspeed is 54 mph and the RPM is 650. This design goal aims to fulfill the large amount of lift and thrust necessary for take-off in the most efficient and quietest way. This involves setting the blade angles so that at no time during normal operations does any location along the blade reach a stall angle of attack, which angle is labeled as 520 in FIG. 5. It also means using propeller blades of high aspect ratio yet with stiffness and strength adequate to tolerate the large amount of thrust required. The high aspect ratio keeps the propeller blade's wetted area and absolute thickness to a minimum, which help reduce noise. The ideal take-off angle of attack for the airfoil of the ultra-quiet propeller in this case and at this blade station is shown at IA in the graph in FIG. 5. as being 1° and providing a $C_L$ of 1.5. Line 510, if followed leftward on the graph, reveals that this 1.5 $C_L$ is the highest $C_L$ that can be employed without a sharp increase in drag coefficient (CU). When this ultra-quiet propeller embodiment operates at its cruise airspeed of 120 mph and 290 RPM, its blades are rotated by the propeller hub through about 27° so that the new angle of attack at this blade station is −2.4° and the $C_L$ is just under 0.4, as shown at 1B in FIG. 5. It will be seen by following line 500 to the left that this 0.4 $C_L$ corresponds to a $C_D$ of just 0.011. The $C_L$ of 0.4 is the lowest $C_L$ that can be employed before this airfoil's drag curve shows a steady increase in $C_D$. The process for selection of optimum take-off angle of attack for high $C_L$ described here is repeated for each airfoil used along the span of the ultra-quiet propeller blade. The resulting angles of attack, along with other parameters, are used in determining the final propeller blade angles along the blade's span.

Figure 6:
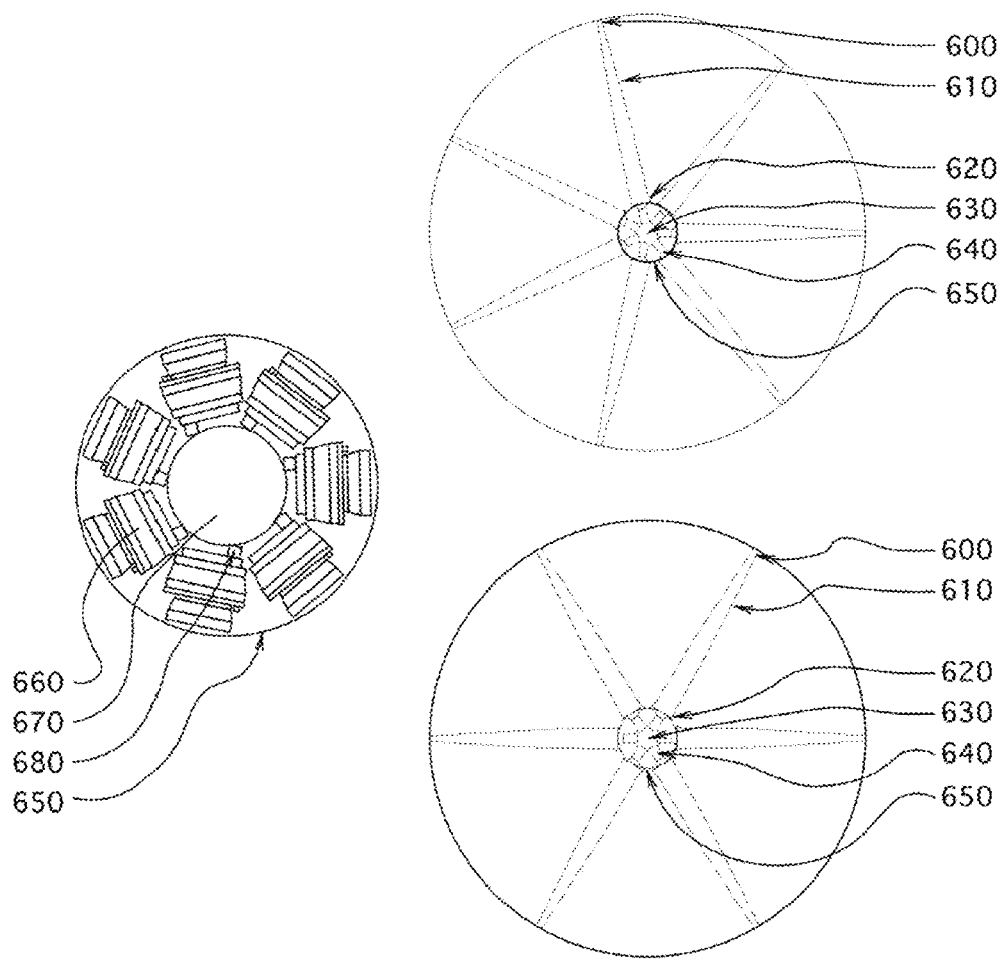
FIG. 6 shows frontal views of exemplary six and seven blade propellers with spinners and blade plan-forms with zero twist, along with a sample controllable pitch hub.

FIG. 6 shows a frontal planform view of two exemplary embodiments of the ultra-quiet propeller, drawn to scale. The topmost propeller has 7 blades with equal spacing between blades and the bottom blade has 6 blades, also with equal spacing. The 6-blade version has blades with 16.67% larger chord in order to have the same total blade area as the 7-blade version. These propellers are shown with zero blade twist in order to better depict their planform shape. For each propeller, the reference numbers denote the same features. Reference number 600 depicts the blade tip. Reference number 610 depicts the trailing edge of the blade at its 0.75R or 75% blade station. Reference number 620 depicts the innermost airfoil of the blade where it exits the streamlined spinner. Reference number 630 depicts the central thrust axis of the propeller. Reference number 640 depicts the outer limit of the round neck of the propeller blade that fits inside the hub. Note that the round neck of each blade is shown here with a round nub at its inner end and without its blade retention clamp 660. Reference number 650 depicts the outer circumference of the streamlined spinner that encloses the hub and the innermost portions of the blade neck and its fillet transition to the innermost blade airfoil. A generic, 7-bladed, controllable pitch propeller hub is also depicted on the left side of FIG. 6. Reference number 660 depicts one of the seven propeller blade retention clamps located inside this hub. Reference number 670 depicts the propeller hub's central round propeller mounting flange, which attaches the hub to the propulsor unit (motor or engine). Each blade retention clamp typically has a cam-following pin on its inner surface, shown as item 680 in FIG. 6. Each cam-following pin in the hub can be moved an equal amount by a small motor inside the hub (not shown) so as to identically rotate each propeller blade to the blade angle that is appropriate for the desired thrust and RPM. Reference number 650 depicts the outer circumference of the streamlined spinner that encloses the 7-bladed hub.

Figure 7:
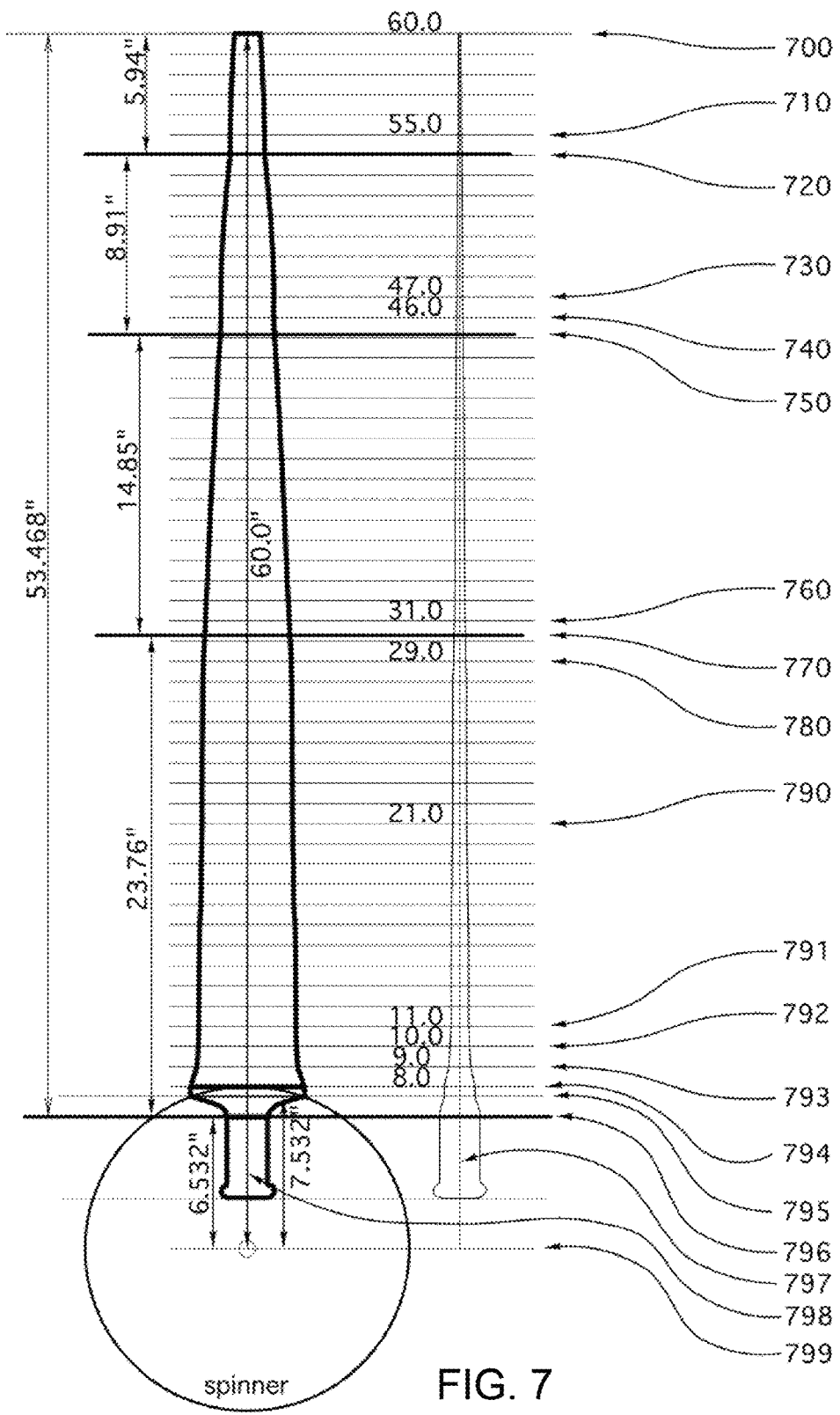
FIG. 7 shows an exemplary high aspect ratio blade plan-form and elevation with twist removed and with span-wise blade stations depicted in inches.

FIG. 7 shows both plan-form and elevation views of an exemplary high aspect ratio, ultra-quiet propeller blade, drawn to scale. The blade stations where changes in airfoil shape occur are shown by the solid lines drawn through the blade. The blade twist is removed for conceptual clarity. The exemplary propeller shown has a 60-inch radius from its thrust axis to its tip with an exposed blade radius of 52.468 inches outside of the skin of the streamlined spinner. It has an average blade chord of 3.542 inches, an actual exposed blade area of 186.88 square inches and a blade aspect ratio of 14.73. At 650 RPM and 54 mph, the maximum take-off thrust of 509 pounds is divided equally between 7 such propeller blades, resulting in a thrust of 72.7 pounds per blade. This makes the average loading of each blade's exposed area just 0.389 pounds per square inch or 56 pounds per square foot. The nominal disc loading of this 10-foot diameter propeller is 6.48 pounds per square foot of propeller disc. Among this embodiment's prime innovations depicted in FIG. 7 is the combination of fulfilling maximum take-off thrust at low RPM with an ultra-quiet, vibration-resistant propeller of adequate stiffness, relatively low disc loading, and high aspect ratio that operates at very high lift coefficients without stall. The propeller blade is shown in FIG. 7 with its shank enclosed in a circle of 16 inches diameter, which represents the streamlined spinner that encloses the propeller hub. The Fibonacci intervals, terminae and their distances are shown relative to the blade stations where vibration-dampening changes in airfoil shape, stiffness and thickness take place. Reference number 700 indicates the tip of the propeller blade at the 60-inch station, where r/R is 1.0 and the airfoil thickness ratio is 8.8%, the blade thickness is 0.114 inches and the chord is 1.3 inches. Reference number 710 indicates the 55-inch station where r/R is 55/60=0.916 and the airfoil thickness ratio is 8.8%, the blade thickness is 0.150 inches and the chord is 1.709 inches. Reference number 720 indicates the thick line that marks the terminus of the first Fibonacci interval at 5.94 inches inboard from the blade tip. An abrupt change in airfoil shape is shown here, wherein the cross-sectional area of the blade increases much more rapidly than over the outboard blade segment. The rate of change of cross-sectional area of the blade, as measured across a 1-inch (25.4) mm span segment centered at each of the Fibonacci terminae, is at least 1.5 times greater than an average rate of change measured across the span of an adjacent outboard Fibonacci interval. Rather than locally increasing the blade's cross-sectional area, an alternative method to provide the intended change in stiffness needed at each Fibonacci terminus is to internally strengthen the 1-inch (25.4 mm) span of that portion of the blade that straddles that location's Fibonacci terminus. This alternative method for interal stiffening can be used at each Fibonacci terminus along the blade, instead of the local increases in blade cross-sectional area shown in this FIG. 7. Reference number 730 marks the 47 inch blade station where r/R is 47/60=0.783 and the airfoil thickness ratio is 10.8%, the blade thickness is 0.281 inches and the chord is 2.6 inches. Reference number 740 marks the 46 inch blade station where r/R is 46/60=0.766 and the airfoil thickness ratio is 11.5%, the thickness is 0.299 inches and the chord is 2.601 inches. Reference number 750 indicates the heavy horizontal line that marks the inner terminus of the second Fibonacci interval, which is 8.91 inches inboard of the terminus of the first Fibonacci interval. Again, there is an abrupt change in cross sectional area of the blade over this terminus of the second Fibonacci interval. Reference number 760 marks the 31-inch blade station where r/R is 31/60=0.516 and the airfoil thickness ratio is 12.7%, the thickness is 0.525 inches and the blade chord is 4.130 inches. Reference number 770 marks the inner terminus of the third Fibonacci interval, which is 14.85 inches inboard of the terminus of the second Fibonacci interval. Again, there is an abrupt change in cross sectional area of the blade over this terminus of the third Fibonacci interval. Reference number 780 marks the 29 inch blade station where r/R is 29/60=0.483 and the airfoil thickness ratio is 14%, the blade thickness is 0.604 inches and the chord is 4.315 inches. Reference number 790 marks the 21 inch blade station where r/R is 21/60=0.35 and the airfoil thickness ratio is 15.4%, the blade thickness is 0.688 inches and the blade chord is 4.465 inches. 791 marks the 11 inch blade station where r/R is 11/60=0.183 and the airfoil thickness ratio is 18.0%, the blade thickness is 0.862 inches and the chord is 4.789 inches. 792 marks the 10 inch blade station where r/R is 10/60=0.166 and the airfoil thickness ratio is 20%, the blade thickness is 0.966 inches and the blade chord is 4.83 inches. 793 marks the 9 inch blade station where r/R is 9/60=0.150 and the airfoil thickness ratio is 22%, the blade thickness is 1.093 inches and the blade chord is 4.97 inches. 794 marks the 8 inch blade station, which is tangent to the spinner skin and where r/R is 8/60=0.133. This 8 inch blade station has an airfoil thickness ratio of 26.9%, a blade thickness of 1.512 inches and a blade chord of 5.62 inches. These same blade dimensions are maintained at the next inboard station, 795, where the blade emerges from the spinner skin. Beginning at the location indicated by 795, the blade shape begins its transition into the round neck. That transition is detailed in FIG. 9. Reference number 796 marks the neck of the blade where its 2-inch diameter, round cylindrical neck begins its outward shape transition into that of a blade airfoil. This neck location is used as the inner terminus for the first pass of the Fibonacci interval calculations on the untwisted blade and is presumed to be the location of the greatest blade bending load and the node of vibration mode 1. The arrow from 797 marks the geometric centerline of the blade in the elevation view. 798 marks the geometric centerline or axis of the blade in the plan-form view. 799 marks a horizontal line that passes through the perpendicular intersection of the plan-form's geometric centerline with the blade's thrust axis.

An analysis to quantify the amount of step-wise change in cross-sectional area of the propeller blade airfoil shapes that occur along the propeller blade at the location of the terminus of each Fibonacci interval in this embodiment reveals the acceptable range for these changes. This analysis is summarized in Table 1 and Table 2.

TABLE 1

| Blade station, inches | Airfoil x-sectional area, square inches | Blade span interval, inches | Area growth per inch of blade span interval, | Increase in area growth per inch |
|---|---|---|---|---|
| 60 | 0.0989 | 5.94 | 0.0156 | |
| 54.56 | 0.1705 | | | |
| 54.06 | 0.1916 | 1 | 0.0413 | 2.65X |
| 53.56 | 0.2118 | | | |
| 54.06 | 0.1916 | 8.91 | 0.0448 | |
| 45.65 | 0.5084 | | | |
| 45.15 | 0.5911 | 1 | 0.1104 | 2.46X |
| 44.65 | 0.6188 | | | |
| 45.15 | 0.5911 | 14.85 | 0.0656 | |
| 30.8 | 1.4374 | | | |
| 30.3 | 1.5651 | 1 | 0.1633 | 2.49X |
| 29.8 | 1.6007 | | | |
| | | | Acceptable range | 1.5 to 3.5X |

The method used in this Table is to compare the cross-sectional areas of the untwisted propeller blade airfoils at the beginning and end of each span-wise Fibonacci interval and use these to determine the rate of change in area occurring over that interval. These rate of change values are then compared to the larger rate of change in airfoil cross-sectional area that occurs over a 1-inch (25.4 mm) portion of blade span that is centered on each of the Fibonacci terminae. This comparison reveals that the rate of change in airfoil cross-sectional area per inch of span that is centered at each Fibonacci terminus exceeds, by roughly 2.5 fold, the value of the rate of change in airfoil cross-sectional area per inch averaged across the larger portion of blade span that comprises the Fibonacci interval distal to its terminus. For example, the first Fibonacci interval whose length is 5.94 inches measured inward from the tip of the propeller blade at blade station 60, terminates at blade station 54.06. The blade airfoil area changes by only 0.0156 square inches per inch across that Fibonacci interval, as shown in Table 1. The blade airfoil area changes at a higher rate, 0.0413 square inches per inch across the short one-inch blade span that is centered at blade station 54.06, which is the Fibonacci terminus of that outermost Fibonacci interval. From this comparison of area change and that of the other intervals analyzed in Table 1, and the knowledge that the deliberately chosen and abrupt step-wise changes in airfoil area at the terminus of each Fibonacci interval must be large enough to substantially disrupt resonant vibration but small enough to not unduly create stress-risers, span-wise airflow and vorticity noise, it is then evident that an exemplary propeller blade should have an increased rate of change of cross sectional area at the Fibonacci terminae that is at least about 1.5 times greater or more, about 2.0 times greater or more, about 2.5 times greater or more, about 3.0 times greater or more, about 3.5 times greater or more, and any range between and including these increased rates of change of cross sectional area. For the purposes of this invention then, the acceptable and relevant range of such changes in blade airfoil cross-sectional area per inch at each Fibonacci interval's terminus is between 1.5 and 3.5 times greater, inclusive, than the rate of cross-sectional area change per inch that occurs along the length of an outboard and adjacent Fibonacci interval, as shown in the Table 1. This range of 1.5 to 3.5 fold will likewise apply to the step-wise area changes in the fully iterated, twisted propeller blade whose wave span and Fibonacci intervals are of different values than in this example case. Note that this 1.5 to 3.5 fold range is not determined relative to the average blade cross-sectional area change that occurs across the entire span of the exposed blade, but rather is determined only relative to the cross-sectional area change along the span of an outboard and adjacent Fibonacci interval. These strategically located, abrupt, step-wise changes in cross-sectional area, which embody the Fibonacci strategy, are an integral part of this ultra-low noise propeller blade design innovation because they enable the blade to have a quiet and efficient high aspect ratio planform while maintaining adequate structural integrity and resistance to resonant vibration modes 1, 2 and 3. The alternative method of using the Fibonacci strategy, which is included in this patent, is to increase by 1.5 to 3.5 fold, at each 1" portion of the blade span that straddles a Fibonacci terminus, the rate of blade stiffness change per inch along the blade span interval that is immediately outboard and adjacent to that Fibonacci terminus, rather than increasing its cross-sectional area. The said blade span interval upon whose rate of blade stiffness change per inch the strategic stiffness increase is to be based, is that blade span interval from the Fibonacci terminus being stiffened to the adjacent Fibonacci terminus just outboard on the blade. In the case wherein there is no adjacent Fibonacci terminus outboard, then the blade tip is to serve as that terminus. The desired local increase in stiffness is obtained by increasing the internal structure of the blade, either by locally thickening its skin or by the addition of local internal ribs and/or bulkheads, or by the local placement of a core material including but not limited to 3D printed metal, nomex honeycomb, high-density foam, wood or other core material. For the purposes of blade balance and smooth operation of the propeller, these local increases in internal structure must be made precisely such that the amount of material added is minimized and is kept equal in both amount and span location in every blade produced.

Figure 8:
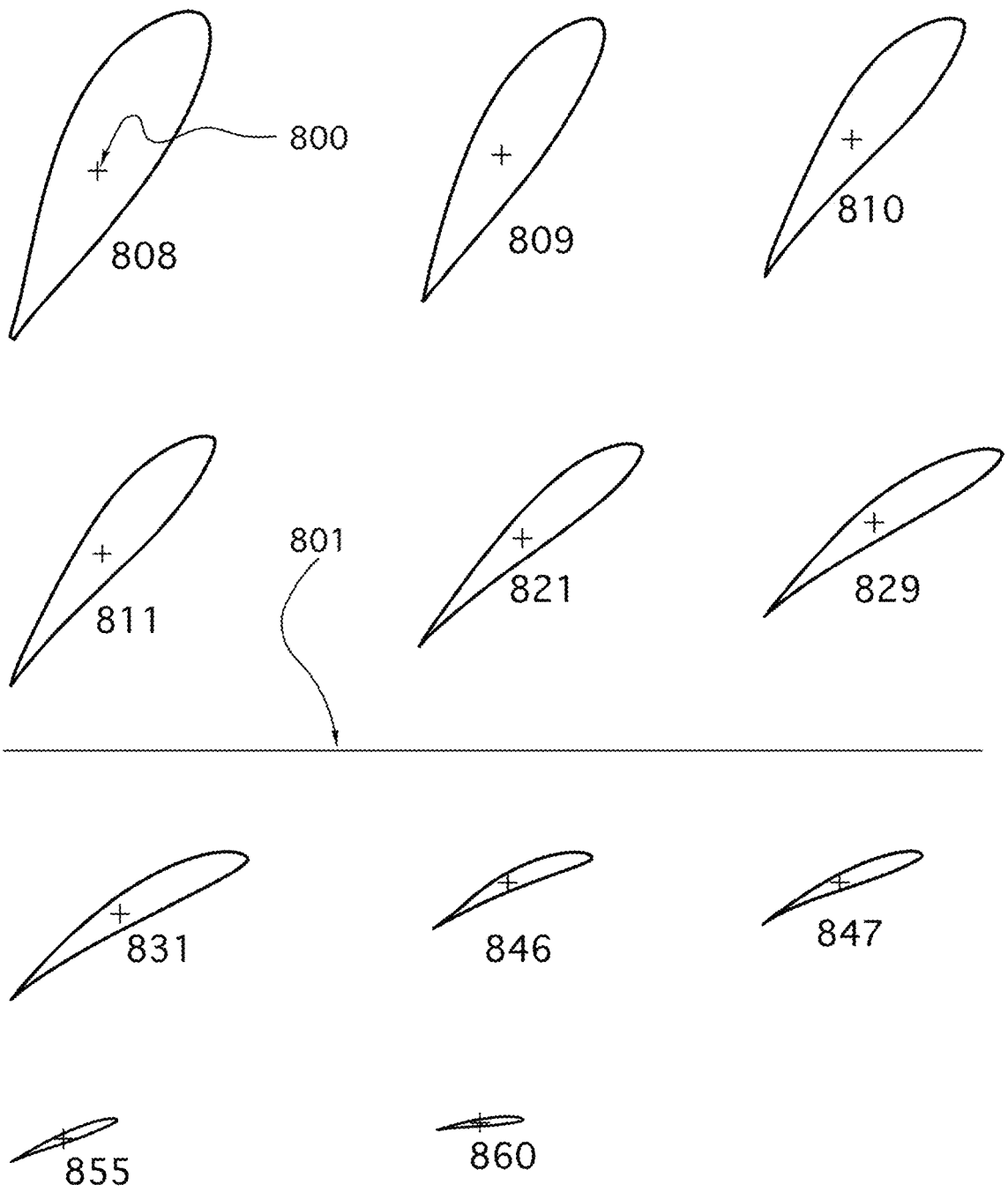
FIG. 8 shows exemplary airfoil shapes drawn to scale, with each shown by its station sequence and its actual blade angle relative to the plane of the imaginary propeller disc. The legend for FIG. 8 is given below in the more detailed explanation.

In FIG. 8, the airfoils used in this embodiment of the ultra-quiet propeller blade are shown drawn to scale and tilted at their respective blade angles relative to the horizontal line shown in the middle of the figure. That line, indicated by reference number 801, is perpendicular to the propeller's thrust axis and represents the imaginary plane of the propeller disc. Each airfoil contains a + symbol whose location, in the preferred embodiment of this invention, represents the radially projected axial center line of the propeller's cylindrical blade root. In this preferred embodiment, this "+" symbol, indicated by reference number 800, is consistently centered at 50% of blade chord and halfway between the upper and lower airfoil surfaces, which is the center point of each airfoil. As such, these+ symbol locations correspond to a propeller blade with zero degrees of sweep angle. The airfoils in FIG. 8 are each for a different blade station along a blade that has a total radius R of 60 inches, and that comprises one of the seven blades in an exemplary 7-bladed propeller of 10 foot diameter. As shown in FIG. 8, each airfoil's blade angle β accounts for the propeller pitch, local angle of attack and local air inflow angle (φ) that pertain during take-off operation with 75 kW of power at maximum thrust at 650 RPM and 54 mph (24 m/sec). Each airfoil is numbered for identification. 808 is the blade's innermost airfoil at a blade station r of 8 inches. It has a 26.9% thickness ratio with a chord of 5.62 inches and is shown at a blade angle of 59.69°. Its area is 5.62 square inches. 809 is the airfoil at the 9 inch blade station. It has a 22.0% thickness ratio with a chord of 4.97 inches and is shown at a blade angle of 57.99°. Its area is 3.68 square inches. 810 is the airfoil at the 10 inch blade station. It has a 20.0% thickness ratio with a chord of 4.83 inches and is shown at a blade angle of 52.39°. Its area is 2.92 square inches. 811 is the airfoil at the 11 inch blade station. It has an 18% thickness ratio with a chord of 4.79 inches and is shown at its blade angle of 50.67°. Its area is 2.58 square inches. 821 is the airfoil at the 21 inch blade station. It has a 15.4% thickness ratio with a chord of 4.465 inches and is shown at its blade angle of 41.92°. Its area is 1.90 square inches. Reference number 829 is the airfoil at the 29 inch blade station. It has a 14% thickness ratio with a chord of 4.315 inches and is shown at its blade angle of 34.71°. Its area is 1.65 square inches. Reference number 831 is the airfoil at the 31 inch blade station. It has a 12.7% thickness ratio with a chord of 4.130 inches and is shown at its blade angle of 31.05°. Its area is 1.42 square inches. 846 is the airfoil at the 46 inch blade station. It has an 11.5% thickness ratio with a chord of 2.601 inches and is shown at its blade angle of 24.28°. Its area is 0.50 square inches. Reference number 847 is the airfoil at the 47 inch blade station. It has a 10.8% thickness ratio with a chord of 2.60 inches and is shown at its blade angle of 23.55°. Its area is 0.444 square inches. Reference number 855 is the airfoil at the 55 inch blade station. It has an 8.8% thickness ratio with a chord of 1.709 inches and is shown at its blade angle of 21.49°. Its area is 0.17 square inches. 860 is the airfoil at the 60 inch blade station, the tip of the propeller blade. It has an 8.8% thickness ratio with a chord of just 1.3 inches and is shown at its radically reduced blade angle of 6.7°. Its area is 0.099 square inches. Table 2 below, summarizes the data for these 11 airfoils for the conditions of 75 kW, 650 RPM, 54 mph, neglecting LIUA+LSDA, the local induced upwash angle and local slow-down angles, which angles vary depending upon airframe and spinner installation details:

TABLE 2

| Reference number # in FIG. 8. | Blade station, inches | Thickness as % of chord | Blade chord, inches | Final blade angle, β | Blade x-sect area, sq. in. | Angle of attack, α | Lift coefficient, $C_L$ |
|---|---|---|---|---|---|---|---|
| 808 | 8 | 26.9% | 5.62 | 59.69° | 5.62 | 6.0 | 0.8 |
| 809 | 9 | 22.0% | 4.97 | 57.99° | 3.68 | 7.0 | 1.0 |
| 810 | 10 | 20.0% | 4.83 | 52.39° | 2.92 | 4.0 | 1.0 |
| 811 | 11 | 18.0% | 4.79 | 50.67° | 2.58 | 4.7 | 1.06 |
| 821 | 21 | 15.4% | 4.465 | 41.92° | 1.90 | 11.0 | 1.6 |
| 829 | 29 | 14% | 4.315 | 34.71° | 1.65 | 9.0 | 1.53 |
| 831 | 31 | 12.7% | 4.130 | 31.05° | 1.42 | 6.8 | 1.5 |
| 846 | 46 | 11.5% | 2.601 | 24.28° | 0.5 | 7.4 | 1.5 |
| 847 | 47 | 10.8% | 2.6 | 23.55° | 0.444 | 7.0 | 1.42 |
| 855 | 55 | 8.8% | 1.709 | 21.49° | 0.17 | 7.25 | 1.06 |
| 860 | 60 | 8.8% | 1.3 | 6.7° | 0.099 | −6.4 | −0.4 |

Figure 9:
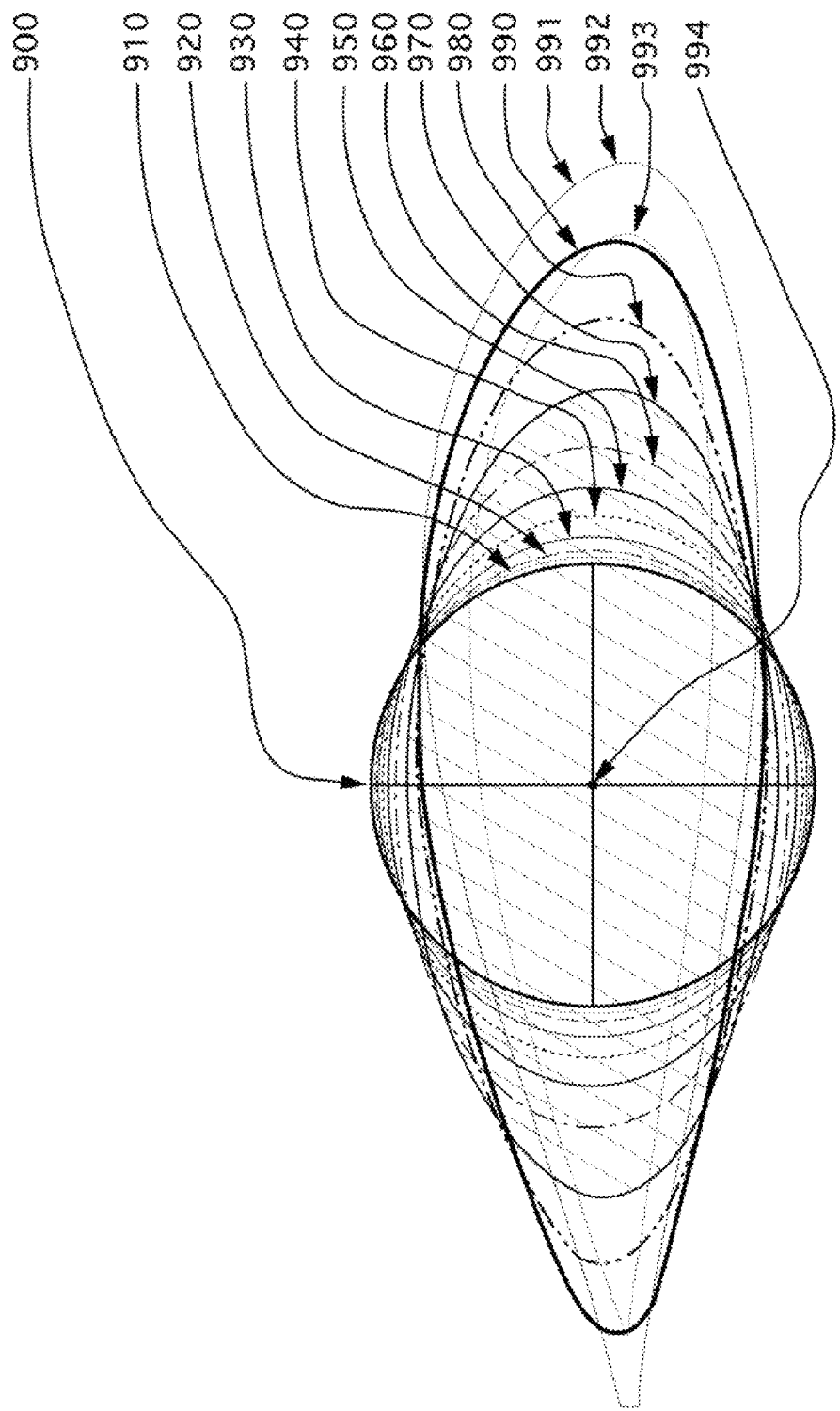
FIG. 9 shows a detailed schedule for the co-axial taper of an exemplary cylindrical blade root of 2-inch (5.08 cm) diameter. The legend for FIG. 9. is given below in the more detailed explanation.

In FIG. 9, the transitions in shape from the propeller blade's round cylindrical neck to the propeller blade's airfoil shapes are depicted as a sequence of numbered shapes of gradually increasing area. Each shape occurs at a specified blade station and each has a chord and height, as well as a cross-sectional area. The shapes specified in FIG. 9 are those of this preferred embodiment of the ultra-quiet propeller blade. These shapes intentionally transition from the shank's round neck to the blade airfoil across a short span of just 1 inch in order to obtain a functioning airfoil shape at the point where the blade emerges from the streamlined spinner. The blade's cylindrical neck is depicted at reference number 900 in FIG. 9 is simply a circle of 2-inch diameter, the innermost shape in this sequence. This shape exists at the blade station of 6.532 inches. Its area is pi, i.e., 3.14159 square inches. Reference number 910 marks the first step in the transition in shape, and its slightly non-round shape is just 0.1 inches outboard of the innermost round shape, at the blade station of 6.632 inches. Its chord is 2.064 inches and its thickness is 1.985 inches. Its area is slightly larger than the innermost station's, at 3.217 square inches. Reference number 920 marks the second step in the transition in shape and its shape occurs at the 6.732-inch blade station. Reference number 920 has a chord of 2.128 inches, a thickness of 1.964 inches and an area of 3.28 square inches. Reference number 930 marks the third step in the transition in shape and its shape occurs at the 6.832-inch blade station. Reference number 930 has a chord of 2.256 inches, a thickness of 1.936 inches and an area of 3.43 square inches. Reference number 940 marks the 4$^{th}$ step in the transition in shape and its shape occurs at the 6.932-inch blade station. Reference number 940 has a chord of 2.45 inches, a thickness of 1.897 inches and an area of 3.65 square inches. Reference number 950 marks the 5$^{th}$ step in the transition in shape and its shape occurs at the 7.032-inch blade station. Reference number 950 has a chord of 2.70 inches, a thickness of 1.84 inches and an area of 3.90 square inches. Reference number 960 marks the 6" step in the transition in shape and its shape occurs at the 7.132-inch blade station. Reference number 960 has a chord of 3.075 inches, a thickness of 1.77 inches and an area of 4.28 square inches. Reference number 970 marks the 7$^{th}$ step in the transition in shape and its shape occurs at the 7.232-inch blade station. Reference number 970 has a chord of 3.65 inches, a thickness of 1.674 inches and an area of 4.675 square inches. Reference number 980 marks the 8" step in the transition in shape and its shape occurs at the 7.332-inch blade station. Reference number 980 has a chord of 4.266 inches, a thickness of 1.592 inches and an area of 4.99 square inches. 990 marks the 9" step in the transition in shape and its shape occurs at the 7.432-inch blade station. Reference number 990 has a chord of 4.93 inches, a thickness of 1.55 inches and an area of 5.53 square inches. Reference number 991 marks the 10" step in the transition in shape and its shape occurs at the 7.532-inch blade station. Reference number 991 has a chord of 5.62 inches, a thickness of 1.513 inches and an area of 5.63 square inches. Reference number 991 is an actual airfoil with a thickness ratio of 26.9%. Reference number 992 marks the 11$^{th}$ step in the transition in shape and its shape occurs at the 8-inch blade station. 992 has a shape identical to 991. Reference number 993 marks the 12$^{th}$ step in the transition in shape and its shape occurs at the 9-inch blade station. Reference number 993 has a chord of 4.97 inches, a thickness of 1.094 inches and an area of 3.668 square inches. Reference number 993 is an actual airfoil of 22% thickness ratio. 994 marks the axial center of the propeller blade, which is also its axis of symmetry and the axis on which the blade is rotated by the controllable pitch hub in order to control the blade's pitch angle.

For FIG. 9, the dimensions are for a 2-inch round blade neck, using the following legend key: All measurements are in inches.

Blade neck details: legend for blade fillet horizontal and vertical dimensions, where x represents the horizontal dimension and y represents the vertical dimension:

Blade station # outside of hub: local radius r in inches, line depiction type (dash, solid, hatched, or pt. thickness): radius x/radius y/diameter x/diameter y/sq. in area/miscellany Legend for FIG. 9:

0.0: r=6.532 inch heavy black circle: 1.0/1.0/2.0/2.0/3.14159 sq. in round neck 1.0: r=6.632 inch 0.1 pt: 1.032/.9925/2.064/1.985/3.2174 sq. in 2.0: r=6.732 inch dashed: 1.064/.982/2.128/1.964/3.2821 sq. in 3.0 r=6.832 inch 0.5 pt: 1.128/.968/2.256/1.936/3.4299 sq. in 4.0 r=6.932 inch dotted: 1.225/.949/2.450/1.897/3.6518 sq. in 5.0 r=7.032 inch 0.85 pt: 1.350/.920/2.700/1.840/3.9014 sq. in 6.0 r=7.132 inch dash-dot: 1.5375/.886/3.075/1.771/4.2791 sq. in 7.0 r=7.232 inch hatched: 1.8245/.837/3.649/1.674/4.6756 sq. in 8.0 r=7.332 inch dash-dot-dot: 2.133/.7895/4.266/1.592/4.9946 sq. in 9.0 r=7.432 inch 2.0 pt: 2.465/.776/4.930/1.552/5.5316 sq. in 10.0 r=7.532 inch no fill: 2.81/.7565/5.62/1.513/5.6259 sq. in/airfoil 26.9% @spinner skin 11.0 r=8.0 inch no fill: 2.81/.7565/5.62/1.513/5.5259 sq. in/airfoil 26.9%

12.0 r=9.0 inch no fill: 2.485/.547/4.97/1.094/3.6681 sq. in/airfoil 22.0%

Figure 10:
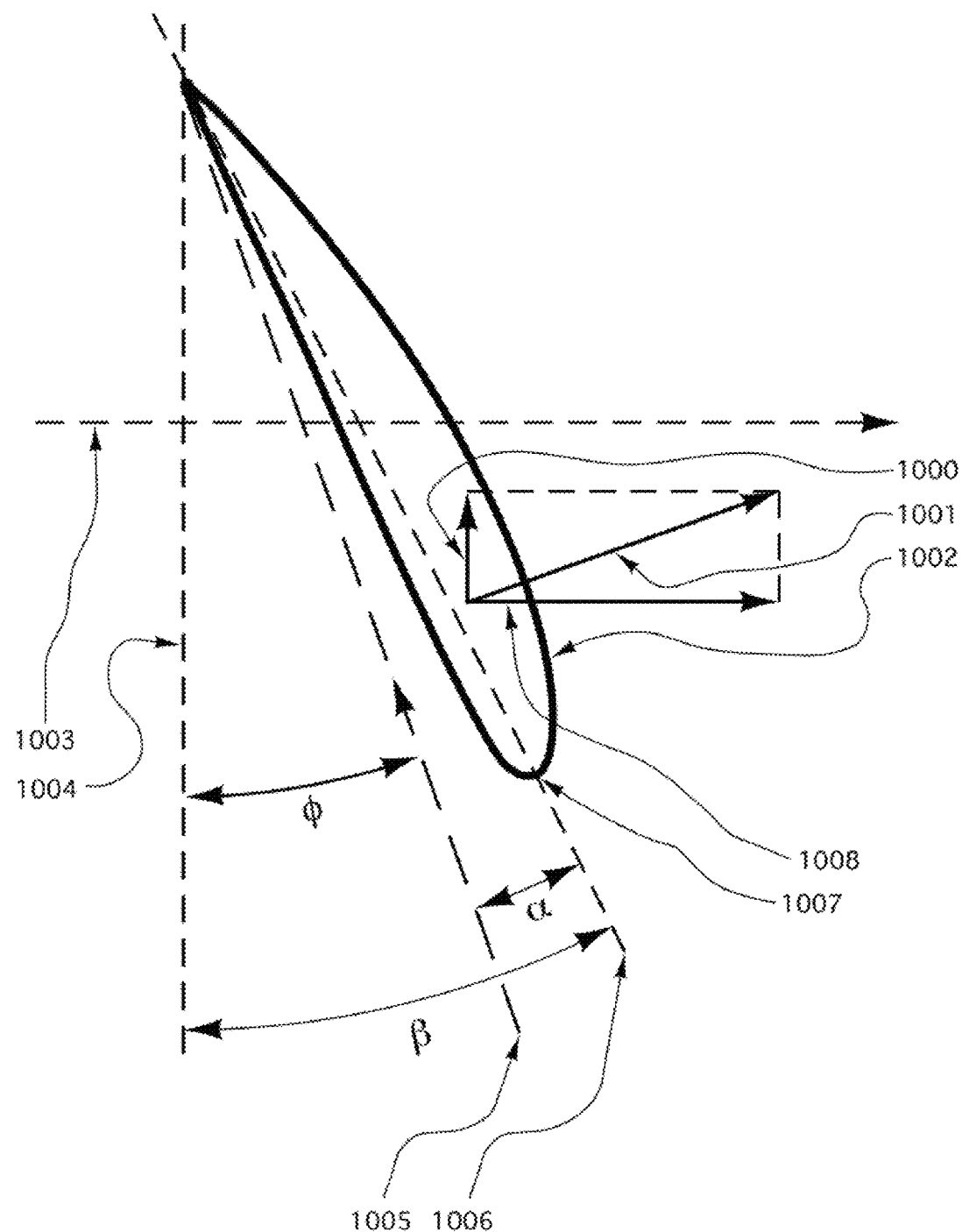
FIG. 10 is a simple diagram to show propeller blade angles and force vectors.

FIG. 10 is a simple diagram to show propeller blade angles and force vectors. The torque vector arrow 1000 of the propeller is parallel to its plane of rotation and perpendicular to the thrust vector arrow 1008. The torque and thrust arrows are scaled from the airfoil's lift vector arrow 1001. All three of these arrows are shown as originating at the 25% chord of the generic propeller blade airfoil reference number 1002. Reference number 1003 indicates an arrow showing the direction of flight. Reference number 1004 is the propeller rotational plane, perpendicular to the direction of thrust. The dashed arrow line, reference number 1005, is the direction of the relative wind and its angle of separation from the propeller rotational plane determines the angle known as $\phi$, the actual advance angle. The dashed line, reference number 1006, is the chord-line of the airfoil, and its angle of separation from the propeller rotational plane determines the blade angle known as $\beta$. The angular difference between $\beta$ and $\phi$ is known as the angle of attack or a (alpha). All three of these angles change at each blade station due to the increasing air velocity as their location moves outboard on the blade span. The chord-line intersects the leading edge of the airfoil at 1007.

Figure 11:
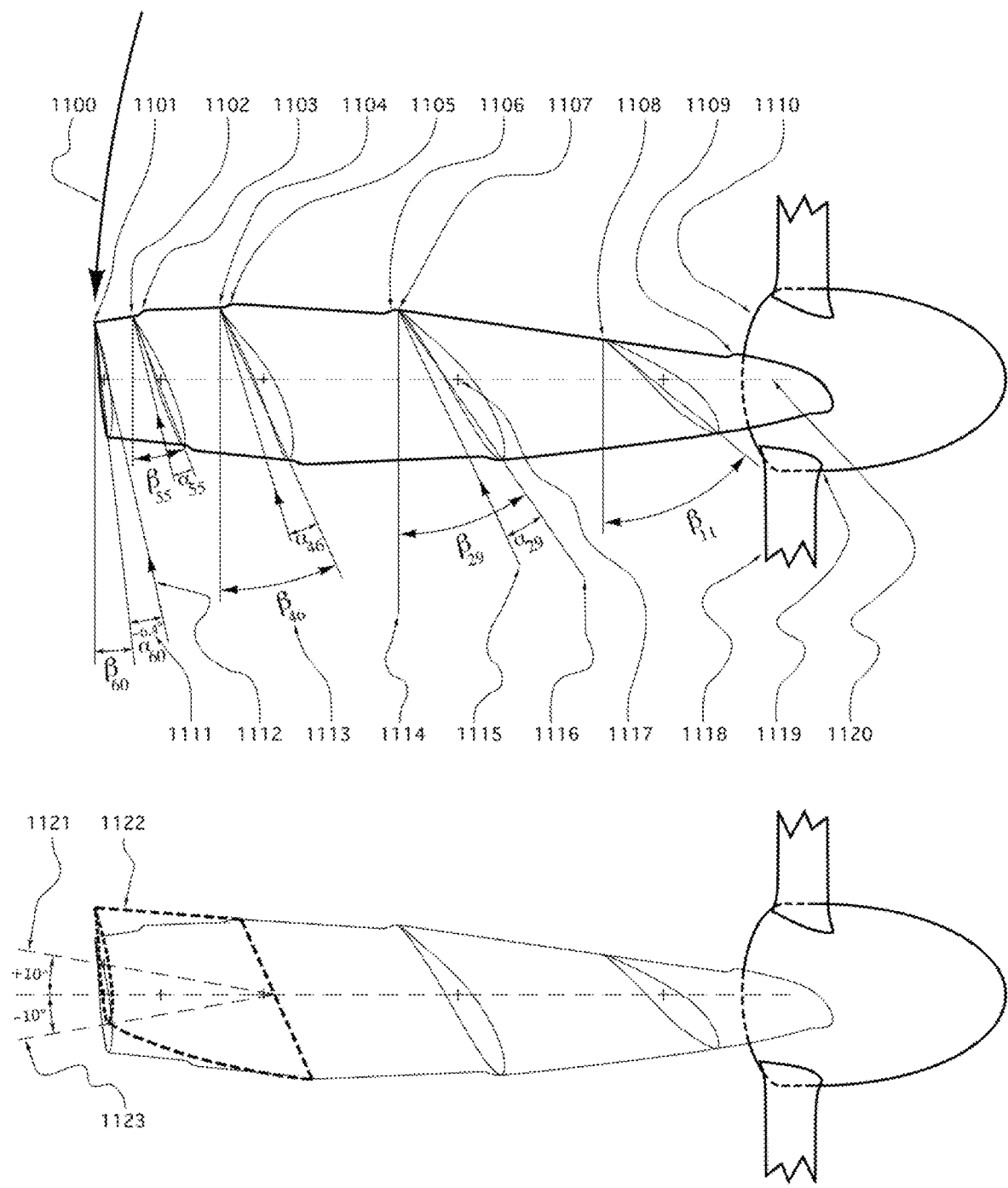
FIG. 11 shows a foreshortened three-quarter view of the exemplary propeller blade and spinner, including not-to-scale conceptual depiction of its stepped changes at Fibonacci terminae, and with some of its airfoils at their respective blade stations, blade angles and angles of attack, including the negative angle attack at the tip. Its lower image depicts the same blade but with an aft sweep angle of +10° at the blade tip.

FIG. 11 depicts, with some exaggerated dimensions, the combined blade angle and shaping strategies of an exemplary propeller blade comprising stepped changes in cross sectional area at the Fibonacci terminae. It shows a foreshortened oblique side view of an exemplary high aspect ratio, non-swept propeller blade including its stepped changes in blade shape, and with a selection of some of its airfoils at their respective blade angles and angles of attack, including the negative angle attack at the propeller blade tip. The lower image in FIG. 11 depicts the same blade but with an aft sweep angle of +10 at the blade tip. FIG. 11 also shows the ragged cut-off stubs of two other propeller blades emanating from the spinner at spacings appropriate to a propeller with seven equally spaced blades. The blade angles, $\beta$, and angles of attack, $\alpha$, shown pertain to an exemplary 10-foot diameter propeller operating at 75 kW and 650 RPM at 54 mph on take-off. The several different blade angles or beta ($\beta$) angles shown in the figure are each appended with a subscript number that indicates their blade station in inches. These 1 angles can be seen to progressively increase at each of the airfoils depicted along the blade from its tip toward the spinner, such that $\beta_{60} < \beta_{55} < \beta_{46} < \beta_{29} < \beta_{11}$. The blade shown has a blade span R of 60 inches as measured from the thrust axis to the tip of the blade. Similarly, the several different angles of attack or alpha (a) angles shown in FIG. 11 are each appended with a subscript number that indicates their blade station in inches. In FIG. 11, reference number 1100 points to the curved line whose arrow indicates the propeller's direction of rotation. Reference number 1101 points to the trailing edge of the outermost airfoil at the propeller tip, which is the 60-inch blade station. Note that at this tip location, the blade airfoil has an angle of attack, $\alpha_{60}$, that is negative at −6.4°, and that, unlike the case with all of the other airfoils shown, the arrow, reference number 1112, depicting the relative wind direction at this 60-inch blade station is pointing toward the upper surface of the airfoil. This unusual direction of the relative wind is due to this invention's extraordinary reduction in blade angle near the tip, and is the deliberate strategy to create negative thrust and a reverse tip vortex that reduces noise. Reference number 1102 points to the trailing edge of the airfoil at the 55 inch blade station where the corresponding blade angle is depicted as Oss and the corresponding local angle of attack is shown α☐☐. Reference number 1103 points to the bulge along the trailing edge that represents an exaggerated depiction of the strategically placed increase in blade cross-sectional area (or increased stiffness) at the blade station location of the Fibonacci terminus of the first Fibonacci interval. A corresponding exaggerated bulge is also shown at the leading edge at this blade station. Reference number 1104 points to the trailing edge of the airfoil at the 46 inch blade station, where the corresponding blade angle is shown as $\beta_{46}$ and the corresponding angle of attack is shown as a. Reference number 1105 points to the bulge along the trailing edge that represents an exaggerated depiction of the strategically placed increase in blade cross-sectional area (or increased stiffness) at the blade station location of the Fibonacci terminus of the second Fibonacci interval. A corresponding exaggerated bulge is also shown at the leading edge at this blade station. Reference number 1106 points to the bulge along the trailing edge that represents an exaggerated depiction of the strategically placed increase in blade cross-sectional area (or increased stiffness) at the blade station location of the Fibonacci terminus of the third Fibonacci interval. A corresponding exaggerated bulge is also shown at the leading edge at this blade station. Reference number 1107 points to the trailing edge of the airfoil at the 29 inch blade station where the corresponding blade angle is depicted as $\beta_{29}$ and the corresponding angle of attack is depicted as $\alpha_{29}$. Reference number 1108 points to the trailing edge of the airfoil at the 11 inch blade station where the corresponding blade angle is depicted as $\beta_{11}$. Note that $\beta_{11}$ is a much larger angle that the more outboard blade angles shown, reflecting the large amount of twist in this propeller blade. Reference number 1109 points to the bulge along the trailing edge that represents an exaggerated depiction of the strategically placed increase in blade cross-sectional area (or increased stiffness) near the blade station location of the Fibonacci terminus of the fourth Fibonacci interval at the blade neck area just outside the spinner. A corresponding exaggerated bulge is also shown at the leading edge at this blade station. Reference number 1110 indicates the trailing edge of the streamlined central spinner that encloses the 7-bladed propeller hub (not shown). Reference number 1111 points to the unusual −6.4° angle of attack at the propeller blade tip. Reference number 1112, as mentioned above, points to the arrow that shows the direction of the relative wind or wind inflow at the propeller tip. Reference number 1113 points to the blade angle at the 46-inch blade station, also labeled as $\beta_{46}$. Reference number 1114 points to one of the straight vertical lines that represents the propeller's plane of rotation, from which reference are measured the blade angles shown. Reference number 1115 points to the arrow that shows the direction of the relative wind or air inflow at the airfoil at the 29-inch blade station. Reference number 1116 points to the chord-line of the airfoil at the 29-inch blade station. Reference number 1117 points to one of the five + signs that are aligned along the blade axis and that depict the center point of each of the five airfoils shown. The center point is that point that is equidistant between the airfoil's leading and the trailing edge and half way between the airfoil's upper and lower surfaces. All of these "+" signs for every airfoil along the blade span are aligned at the center point of their airfoil and are on the dashed line that represents the blade axis 1120 of the propeller blade, making this a propeller blade with zero sweep angle. Reference number 1118 points to one of the propeller's other blades shown merely as a stub exiting from the spinner. Reference number 1119 shows the snug fit of the spinner surface to the leading edge of the propeller blade stub and that the shape of the spinner both at this point and aft-ward of this point to the spinner trailing edge, is essentially that of a cylinder of 16 inch diameter. Reference number 1121 points to the line drawn from the center point of the blade at the 0.75R blade station through the center point of the blade tip when the blade tip has a +100 aft blade sweep angle relative to the blade axis 1120. Reference number 1122 points to the dashed line that represents an outline of a blade tip with a +10° aft sweep angle. Reference number 1123 points to the line drawn from the center point of the blade at the 0.75R blade station through the imaginary center point of a blade tip if such blade tip were to have a −10° forward blade sweep angle.

Figure 12:
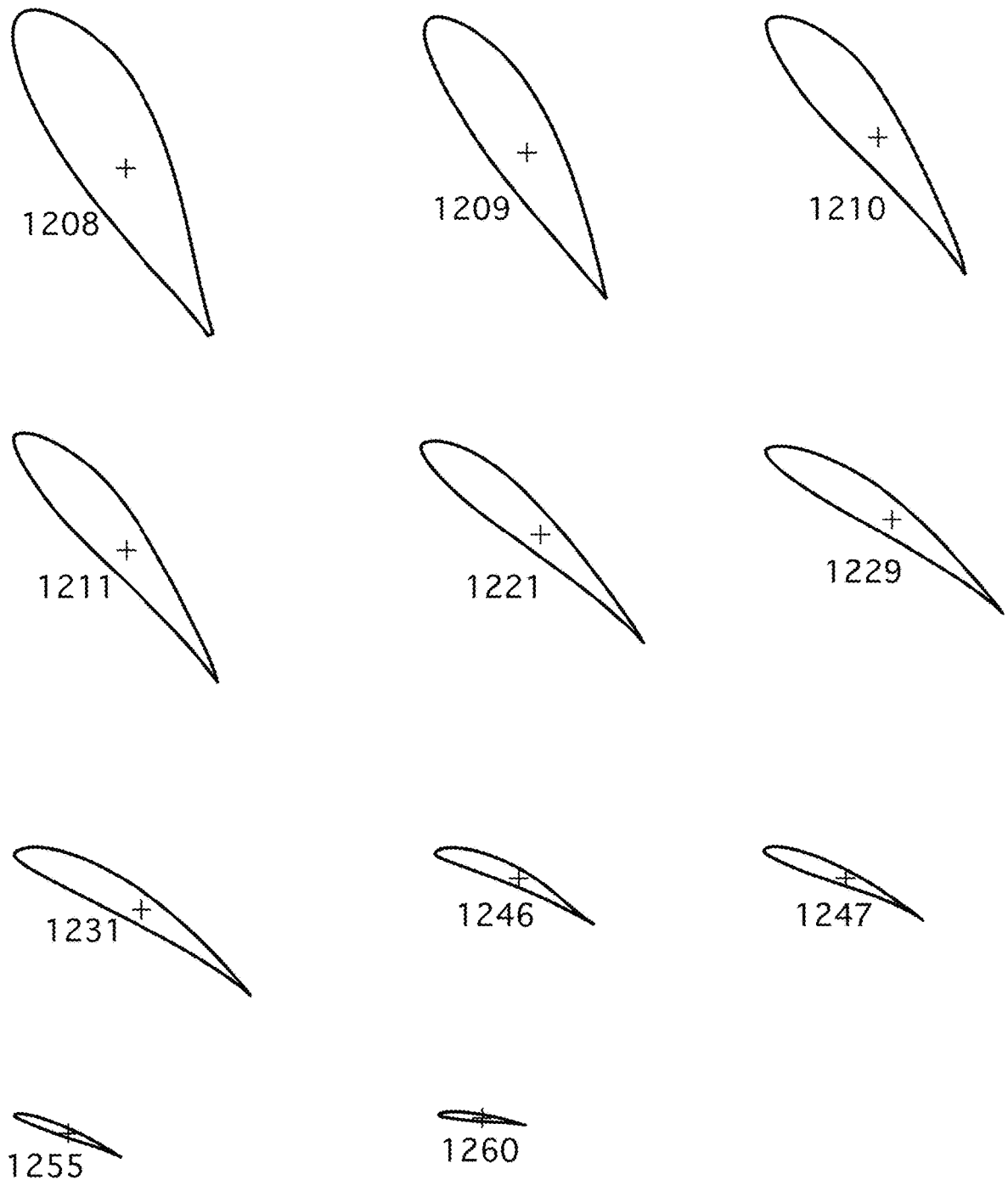
FIG. 12 shows the mirror images of the airfoils and angles shown in FIG. 8.

FIG. 12 depicts the same airfoil shapes, sizes and blade angles as in FIG. 8, except that those in FIG. 12 are mirror images of those in FIG. 8 and represent those that would be used in a preferred propeller system whose nominal direction of rotation was opposite to that of the propeller airfoils depicted in FIG. 8. The reference numbers shown in FIG. 12 correspond to those used in FIG. 8, except that they are preceded with a 12 instead of an 8, as in the following examples: Reference numbers 808, 809 and 810 in FIG. 8 are the labels for airfoils that are shown in FIG. 12 as mirror-images with reference numbers 1208, 1209, and 1210, respectively.

An exemplary embodiment of this invention is one that maximally exploits the noise-reducing strategies described herein. It is shown in FIGS. 6, 7, 8, 9, 11 and 12 as a 10-foot diameter propeller that has straight, high aspect ratio composite blades with step-wise shape changes at the terminae of Fibonacci intervals, FBA's tailored to produce the desired take-off thrust distribution, high lift coefficient laminar flow airfoils that work well at low Reynolds numbers, internal aramid fiber braids as core material to its carbon fiber composite blades, CFD-tailored span-wise pressure gradient optimization, and high thrust at low RPM operation during take-off. Its blade necks fit inside a 16 inch diameter spinner. It is designed to deliver 509 pounds of thrust with 75 kW at 54 mph at 650 RPM. The blades are retained in a 7-bladed electrically controllable hub that provides rapid adjustment of identical pitch settings for each blade as needed.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention covers the modifications, combinations and variations of this invention provided they come within the scope of the appended claims and their equivalents.

The entirety of the following references are hereby incorporated by reference herein:

[1] http://www.dtic.mil/dtic/tr/fulltext/u2/a801204.pdf
Arthur F. Deming, 1940 NACA TN 747. This paper divides propeller noise into two classifications: either rotational noise or vortex noise.

[2] http://www.dtic.mil/dtic/tr/fultext/u2/a80336.pdf) Hicks and Hubbard, 1947 This paper confirms that a 7-bladed prop turning slowly results in reduced noise, but that reduced noise is unpredictable and not adequately explained. The present invention aims to overcome this with new blade design strategies to control vorticity and vibration.

[3]http://www.dtic.mil/dtic/tr/fultext/u2/779773.pdf Griffitth et al, 1974 This paper shows low noise from large diameter slow-turning propellers whose blade shape (chord and taper) are radically different from the present invention. Vortex noise in this study predominated as an unexplainable factor requiring extensive fudge factors to be applied to the Air Force's noise predictive software. See pages 14-50.

[4] http://www.dtic.mil/dtic/tr/fulltext/u2/731156.pdf Brown and Ollerhead, 1971 This paper affirms the presence of several poorly understood and variable noise sources for rotating propellers, and confirms that some of these noise sources predominate at very low tip speeds. It also confirms that blade stall and transition to turbulent flow adds noise, that tip noise is a major factor and that all sources of noise summate and so must be addressed.

[5]https://www.ncbi.nlm.nih.gov/pmc/articles/PMC2954552/European airport noise surveys. FIG. 2. in this reference shows a composite of multiple noise tolerance surveys that confirm the need for ultra-quiet propellers and show the very low noise levels in dB that must be maintained at airpark boundaries.

[6]https://www.gpo.gov/fdsys/pkg/CFR-2011-title36-vol1/xml/CFR-2011-title36-vol1-chapl.xml National Park Service regulations, section 2.12 This paper affirms a noise limit of 50 dBA at a 50 foot sideline as the limit for devices such as radios and generators used in quiet National Parks.

[7]http://m-selig.ae.illinois.edu/pubs/BrandtSelig-2011-AIAA-2011-1255-LRN-Propellers.pdf. This paper documents that with Reynolds numbers below 100,000, maximum propeller efficiency is only 0.65 and supports this invention's strategic use of airfoils that are designed to perform well at low Reynolds numbers.

[8]http://m-selig.ae.illinois.edu/pubs/DetersAnandaSelig-2014-AIAA-2014-2151.pdf. This paper corroborates that Reynolds numbers below 100,000 are associated with low levels of propeller efficiency.

[9]https://ntrs.nasa.gov/archive/nasacasi.ntrs.nasa.gov/19880014604.pdf This 1987 Townsend NASA paper on irregular stiffness intervals deliberately disrupting & dampening vibration nodes shows that a tapered beam's vibration mode lengths and amplitudes can be modified by periodic changes in beam stiffness, affirming that this invention's use of such periodic changes can dampen vibration and thereby noise.

[10]http://journals.sagepub.com/doi/pdf/10.1177/1077546314528964 This 2014 paper shows the principle of achieving vibration reduction at desired locations on a beam by creating nodes using tunable vibration neutralizers.

[11]http://ethesis.nitrk.ac.in/5005/1/Vibration_Analysis_of_Tapered_Beam.pdf This 2014 paper presents vibration analysis of a tapered Beam, and affirms that finite element modeling is able to predict the effect of varying beam taper (blade taper) on vibration modes and node locations.

[12]http://citeseerx.ist.psu.edu/viewdoc/download?doi=10.1.1.1016.3081&rep=rep 1&type-pdf. This 1966 NASA paper studies tapered cantilevered beam vibration node locations. Page 69 shows that the node for mode 1 remains essentially at the root and separations between nodes for mode 2 changed relatively little across radical changes in taper ratio. Node separations for mode 3 for tapered beams stay largely constant as taper ratio changes radically. Twist alters node separations more than does taper.

[13]https://calhoun.nps.edu/bitstream/handle/10945/14314/investigationofe00klet.pdf?sequence=1 This paper states that "Twist has very little effect upon the fundamental frequency . . . of the beam. This frequency increases very slightly as the twist is increased through 30 degrees. The data point obtained at 40.4 degrees of twist indicates that there is a possibility of a more rapid rise in frequency as the twist is increased beyond this point." Page 12. [and, on page 14, top, states that]: "It was noted that the node lines tend to move toward the free end of the beam as twist is increased to about 20 degrees".

[14]https://vtol.org/files/dmile/UMD_20051.pdf Atlas Helicopter paper: pg. 19, cites the following: "Another key factor, only possible with composites (blades), is the introduction of couplings between bending and torsion modes." It then goes on to describe the use of IM7 graphite in the rotor blade instead of a hybrid of graphite and aramid fiber ('Kevlar'). The optimization of the coupling between bending and torsion modes by use of hybrid fiber types and novel, braided fiber placements is one of the innovations in this invention.

[15]http://pubs.sciepub.com/jmdv/1/1/4/This 2013 paper documents that varying composite fiber orientation in beams can effectively raise their vibration mode frequencies. It supports this invention's strategy of using this technique to quell propeller blade noise.

What is claimed is:

1. An aerodynamic propeller system comprised of:
   a hub;
   a plurality of propeller blades ranging from 4 to 10 blades, that are coupled to said hub, each of said plurality of propeller blades comprising:
   a) a leading and trailing edge; and
   b) a chord-line having a chord length, wherein the chord-line is the shortest straight-line distance from the leading edge to the training edge; and
   c) a tip; and
   d) a root at the opposite end of the propeller blade from the tip and wherein the root is coupled to a central hub; and
   e) a neck that is a portion of said blade adjacent the central hub; and
   f) a thrust axis that is at the center of the propeller hub and is perpendicular to the propeller disc's plane of rotation; and
   g) a total blade radius that is the distance from the tip to the center of the hub, wherein said center is configured on the thrust axis of the propeller; and
   h) a blade axis that is the imaginary straight line perpendicular to the thrust axis and drawn radially outward from the axial center of the blade root; and
   i) a blade sweep angle that is no more than 10° in either forward or aft direction along the outermost 25% of total blade radius; and
   j) a helical tip speed that is kept below 500 feet per second during take-off and flight; and
   k) an aspect ratio ranging between 9 and 18 over an exposed blade portion; and
   l) a Reynolds number that is kept below 750,000 as measured at the 0.75R blade station during the flight operations of take-off and initial climb.

2. The aerodynamic propeller system of claim 1, wherein each of said plurality of propeller blades have a length from a root to a tip that is at least 3.25 ft long.

3. The aerodynamic propeller system of claim 1, wherein the hub is a fixed pitch hub including a hub that is a ground-adjustable fixed-pitch hub.

4. The aerodynamic propeller system as set forth in claim 1, wherein the hub is a controllable pitch hub that allows controlled rotation of each blade around its blade axis to create a change in blade pitch.

5. The aerodynamic propeller system of claim 1, wherein each of the plurality of propeller blades comprises a noise reducing feature comprising an airfoil shape with negative camber extending over at least a portion of an outermost 7% of the total blade radius.

6. The aerodynamic propeller system of claim 1, wherein each of the plurality of propeller blades comprises a noise reducing feature comprising a progressively and continuously decreasing blade angle over at least a portion of an outermost 25% of the total blade radius in order to produce a progressive and continuous reduction in thrust to reach a negative thrust at the tip.

7. The aerodynamic propeller system of claim 6, wherein the progressively and continuously decreasing blade angle toward the tip of the propeller blade, produces a tip vortex of opposite direction to that of the conventional tip vortex.

8. The aerodynamic propeller system of claim 7, wherein the noise reducing feature further comprises an airfoil shape with negative camber extending over at least a portion of an outermost 7% of the total blade radius.

9. The aerodynamic propeller system of claim 1, wherein each of the plurality of propeller blades comprise a series of at least three stepped local changes in blade stiffness configured at intervals along the propeller total blade radius so as to reduce vibration;
 wherein said series of at least three stepped changes in blade stiffness are made along the wave span of the propeller at intervals defined as Fibonacci intervals; and
 wherein said Fibonacci intervals are located consecutively along the wave span starting from the tip and proceeding towards the root and are defined as the products from multiplying the Fibonacci quotient by each number in a refined Fibonacci number series;
 wherein said Fibonacci quotient is a blade wave span that is a ¼ wavelength of vibration mode 1 over a Fibonacci sum of 29.124;
 wherein said Fibonacci sum is the sum of the refined Fibonacci number series;
 wherein said refined Fibonacci number series is a series of numbers obtained by multiplying a universal golden ratio of 1.618 times each of the numbers in the Fibonacci number series, which are 3, 5, 8, and 13,
 wherein the span-wise locations at an inboard end of each of the Fibonacci intervals are Fibonacci terminae; and
 wherein the rate of change of blade stiffness per inch of blade radius, as measured across a 25.4 mm span segment centered at each of the Fibonacci terminae, is at least 1.5 times greater and up to 3.5 times greater than an average rate of stiffness change measured across the span of an entire adjacent outboard Fibonacci interval.

10. The aerodynamic propeller system of claim 9, wherein said series of at least three stepped changes in blade stiffness are made along a wave span of the propeller at Fibonacci intervals that fall in between a series of nodes of blade vibration modes 1, 2 and 3; and wherein the span-wise locations of said blade vibration nodes are calculated for a twisted blade shape by finite element analysis software.

11. The aerodynamic propeller system of claim 10, wherein each of said plurality of propeller blades is anisotropic and vibration self-dampening, wherein a lower surface of each of the propeller blades has a tensile modulus that is at least 25% greater than a compressive modulus of said lower surface.

12. The aerodynamic propeller system of claim 10, wherein each of said plurality of propeller blades is made of a composite material comprising:
 a) carbon fiber; and
 b) aramid fiber; and
 wherein the carbon fiber and aramid fiber are woven such that a blade's lower surface has a tensile modulus that is at least 25% greater than a compressive modulus of said lower surface, thereby dampening vibration and noise.

13. The aerodynamic propeller system of claim 12, wherein the hub is a fixed pitch hub including a hub that is a ground-adjustable fixed-pitch hub.

14. The aerodynamic propeller system as set forth in claim 12, wherein the hub is a controllable pitch hub that is able to rapidly perform an identical angular amount of controlled rotation of each blade around its blade axis as needed to create a change in blade pitch that offers optimum performance at a given flight speed and RPM.

15. The aerodynamic propeller system of claim 1, wherein each of the plurality of propeller blades comprise a series of at least three stepped changes in blade stiffness configured at intervals along the propeller total blade radius so as to reduce vibration;
 wherein said series of at least three stepped changes in blade stiffness are made along the wave span of the propeller at intervals defined as Fibonacci intervals;
 wherein said Fibonacci intervals are located consecutively along the wave span starting from the tip and proceeding towards the root and are defined as the products from multiplying the Fibonacci quotient by each number in a refined Fibonacci number series;
 wherein said Fibonacci quotient is a blade wave span that is % wavelength of vibration mode 1 divided by a Fibonacci sum of 29.124;
 wherein said Fibonacci sum is the sum of the refined Fibonacci number series;
 wherein said refined Fibonacci number series is a series of numbers obtained by multiplying a universal golden ratio of 1.618 times each of the numbers in the Fibonacci number series, which are 3, 5, 8, and 13;
 wherein the span-wise locations at an inboard end of each of the Fibonacci intervals are Fibonacci terminae; and
 wherein the rate of change of blade stiffness per inch of blade radius, as measured across a 25.4 mm span segment centered at each of the Fibonacci terminae, is at least 1.5 times greater and up to 3.5 times greater than an average rate of stiffness change measured across the span of an entire adjacent outboard Fibonacci interval.

16. The aerodynamic propeller system of claim 15, wherein said series of at least three stepped changes in blade stiffness are made along a wave span of the propeller at Fibonacci terminae that fall in between a series of nodes of blade vibration modes 1, 2 and 3; and wherein the span-wise locations of said blade vibration nodes are calculated for a twisted propeller blade shape by finite element analysis software.

17. The aerodynamic propeller system of claim 16, wherein each of said plurality of propeller blades is anisotropic and vibration self-dampening, wherein a lower surface of each of the propeller blades has a tensile modulus that is at least 25% greater than a compressive modulus of said lower surface.

18. The aerodynamic propeller system of claim 17, wherein each of said plurality of propeller blades is made of a composite material comprising:
  a) carbon fiber; and
  b) aramid fiber, and
  wherein the carbon fiber and aramid fiber are woven such that a blade's lower surface has a tensile modulus that is at least 25% greater than a compressive modulus of said lower surface, thereby dampening vibration and noise.

19. The aerodynamic propeller system of claim 18, wherein the hub is a fixed pitch hub including a hub that is a ground-adjustable fixed-pitch hub.

20. The aerodynamic propeller system of claim 18, wherein the hub is a controllable pitch hub that is able to rapidly perform an identical angular amount of controlled rotation of each blade around its blade axis as needed to create a change in blade pitch that offers optimum performance at a given flight speed and RPM.

* * * * *